(12) United States Patent
Jin et al.

(10) Patent No.: US 11,874,809 B2
(45) Date of Patent: Jan. 16, 2024

(54) BUILDING SYSTEM WITH NAMING SCHEMA ENCODING ENTITY TYPE AND ENTITY RELATIONSHIPS

(71) Applicant: Johnson Controls Tyco IP Holdings LLP, Milwaukee, WI (US)

(72) Inventors: ZhongYi Jin, Santa Clara, CA (US); Erik S. Paulson, Madison, WI (US); Simin Zhou, Santa Clara, CA (US); Ryan A. Piaskowski, Milwaukee, WI (US); Youngchoon Park, Brookfield, WI (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 126 days.

(21) Appl. No.: 16/895,817

(22) Filed: Jun. 8, 2020

(65) Prior Publication Data
US 2021/0382861 A1  Dec. 9, 2021

(51) Int. Cl.
*G06F 16/21* (2019.01)
*G06F 16/28* (2019.01)
*G05B 19/042* (2006.01)

(52) U.S. Cl.
CPC .......... *G06F 16/211* (2019.01); *G05B 19/042* (2013.01); *G06F 16/288* (2019.01); *G05B 2219/2614* (2013.01)

(58) Field of Classification Search
CPC ... G06F 16/211; G06F 16/288; G05B 19/042; G05B 2219/2614
See application file for complete search history.

(56) References Cited

U.S. PATENT DOCUMENTS

| 5,301,109 A | 4/1994 | Landauer et al. |
| 5,446,677 A | 8/1995 | Jensen et al. |

(Continued)

FOREIGN PATENT DOCUMENTS

| AU | 2019226217 A1 | 11/2020 |
| AU | 2019226264 A1 | 11/2020 |

(Continued)

OTHER PUBLICATIONS

Gamer et al., EP 3 156 856 A1 , Application No. 15002934.6, Date of filing : Oct. 15, 2015 (Year: 2015).*

(Continued)

*Primary Examiner* — Mohsen Almani
(74) *Attorney, Agent, or Firm* — Foley & Lardner LLP

(57) ABSTRACT

A building system of a building, the building system comprising one or more memory devices storing instructions thereon, that, when executed by one or more processors, cause the one or more processors to receive building metadata, the building metadata describing a plurality of components of the building, generate, based on the building metadata, a plurality of entities, each of the plurality of entities representing one of the plurality of components, and determine, based on the building metadata, relationships between the plurality of entities. The instructions cause the one or more processors to generate a plurality of metadata strings in a universal building schema comprising a plurality of characters representing a first entity of the plurality of entities, one or more second entities of the plurality of entities related to the first entity, and one or more relationships between the first entity and the one or more second entities.

23 Claims, 21 Drawing Sheets

(56) References Cited

U.S. PATENT DOCUMENTS

| | | |
|---|---|---|
| 5,581,478 A | 12/1996 | Cruse et al. |
| 5,812,962 A | 9/1998 | Kovac |
| 5,960,381 A | 9/1999 | Singers et al. |
| 5,973,662 A | 10/1999 | Singers et al. |
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,401,057 B2 | 7/2008 | Eder |
| 7,552,467 B2 | 6/2009 | Lindsay |
| 7,627,544 B2 | 12/2009 | Chkodrov et al. |
| 7,818,249 B2 | 10/2010 | Lovejoy et al. |
| 7,889,051 B1 | 2/2011 | Billig et al. |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,229,470 B1 | 7/2012 | Ranjan et al. |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,070,113 B2 | 6/2015 | Shafiee et al. |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,753,455 B2 | 9/2017 | Drees |
| 9,811,249 B2 | 11/2017 | Chen et al. |
| 9,838,844 B2 | 12/2017 | Emeis et al. |
| 9,886,478 B2 | 2/2018 | Mukherjee |
| 9,948,359 B2 | 4/2018 | Horton |
| 10,055,114 B2 | 8/2018 | Shah et al. |
| 10,055,206 B2 | 8/2018 | Park et al. |
| 10,116,461 B2 | 10/2018 | Fairweather et al. |
| 10,169,454 B2 | 1/2019 | Ait-Mokhtar et al. |
| 10,171,297 B2 | 1/2019 | Stewart et al. |
| 10,171,586 B2 | 1/2019 | Shaashua et al. |
| 10,187,258 B2 | 1/2019 | Nagesh et al. |
| 10,417,451 B2 | 9/2019 | Park et al. |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,564,993 B2 | 2/2020 | Deutsch et al. |
| 10,705,492 B2 | 7/2020 | Harvey |
| 10,708,078 B2 | 7/2020 | Harvey |
| 10,760,815 B2 | 9/2020 | Janakiraman et al. |
| 10,762,475 B2 | 9/2020 | Song et al. |
| 10,824,120 B2 | 11/2020 | Ahmed |
| 10,845,771 B2 | 11/2020 | Harvey |
| 10,854,194 B2 | 12/2020 | Park et al. |
| 10,862,928 B1 | 12/2020 | Badawy et al. |
| 10,921,760 B2 | 2/2021 | Harvey |
| 10,921,972 B2 | 2/2021 | Park et al. |
| 10,969,133 B2 | 4/2021 | Harvey |
| 10,976,068 B2 | 4/2021 | Hallendy et al. |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,041,650 B2 | 6/2021 | Li et al. |
| 11,054,796 B2 | 7/2021 | Holaso |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,229,138 B1 | 1/2022 | Harvey et al. |
| 11,314,726 B2 | 4/2022 | Park et al. |
| 11,314,788 B2 | 4/2022 | Park et al. |
| 11,556,105 B2 | 1/2023 | Cooley et al. |
| 11,561,522 B2 | 1/2023 | Cooley et al. |
| 11,561,523 B2 | 1/2023 | Cooley et al. |
| 11,573,551 B2 | 2/2023 | Cooley et al. |
| 11,586,167 B2 | 2/2023 | Cooley et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0095521 A1 | 5/2006 | Patinkin |
| 2006/0136179 A1* | 6/2006 | Sit .......................... G06F 30/00 703/1 |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0261062 A1 | 11/2007 | Bansal et al. |
| 2007/0273497 A1 | 11/2007 | Kuroda et al. |

(56) References Cited

U.S. PATENT DOCUMENTS

| | | |
|---|---|---|
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1* | 1/2012 | Mackay .................. G06Q 10/06 700/275 |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2013/0338970 A1 | 12/2013 | Reghetti |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | Mcfarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0247129 A1 | 8/2016 | Song et al. |
| 2016/0260063 A1 | 9/2016 | Harris et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357521 A1 | 12/2016 | Zhang et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |

(56) References Cited

U.S. PATENT DOCUMENTS

| | | |
|---|---|---|
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1* | 9/2017 | Nagano ............... G06F 16/9024 |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | Macmillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gärtner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0356775 A1 | 12/2018 | Harvey |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0050942 A1* | 2/2019 | Dalal ................... G06N 3/0454 |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0102840 A1 | 4/2019 | Perl et al. |
| 2019/0121801 A1 | 4/2019 | Jethwa et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0268178 A1 | 8/2019 | Fairweather et al. |
| 2019/0310979 A1 | 10/2019 | Masuzaki et al. |
| 2019/0377306 A1 | 12/2019 | Harvey |
| 2020/0133978 A1 | 4/2020 | Ramamurti et al. |
| 2020/0226156 A1 | 7/2020 | Borra et al. |
| 2020/0285203 A1 | 9/2020 | Thakur et al. |
| 2020/0336328 A1 | 10/2020 | Harvey |
| 2020/0348632 A1 | 11/2020 | Harvey |
| 2020/0387576 A1 | 12/2020 | Brett et al. |
| 2020/0396208 A1 | 12/2020 | Brett et al. |
| 2021/0042299 A1 | 2/2021 | Migliori |
| 2021/0043221 A1 | 2/2021 | Yelchuru et al. |
| 2021/0232724 A1* | 7/2021 | Tierney ................... G06F 30/18 |
| 2021/0325070 A1 | 10/2021 | Endel et al. |
| 2021/0342961 A1 | 11/2021 | Winter et al. |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0121965 A1 | 4/2022 | Chatterji et al. |
| 2022/0138684 A1 | 5/2022 | Harvey |
| 2022/0147000 A1 | 5/2022 | Cooley et al. |
| 2022/0150124 A1 | 5/2022 | Cooley et al. |
| 2022/0215264 A1 | 7/2022 | Harvey et al. |
| 2023/0010757 A1 | 1/2023 | Preciado |
| 2023/0071312 A1 | 3/2023 | Preciado et al. |
| 2023/0076011 A1 | 3/2023 | Preciado et al. |
| 2023/0083703 A1 | 3/2023 | Meiners |

FOREIGN PATENT DOCUMENTS

| | | |
|---|---|---|
| AU | 2019351573 A1 | 5/2021 |
| CN | 101415011 A | 4/2009 |
| CN | 102136099 A | 7/2011 |
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 268 821 B1 | 1/2018 |
| EP | 3 324 306 A1 | 5/2018 |
| EP | 4 226 263 A1 | 8/2023 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |
| WO | WO-2018/132112 A1 | 7/2018 |
| WO | WO-2020/061621 A1 | 4/2020 |
| WO | WO-2022/042925 A1 | 3/2022 |
| WO | WO-2022/103812 A1 | 5/2022 |
| WO | WO-2022/103813 A1 | 5/2022 |
| WO | WO-2022/103820 A1 | 5/2022 |

(56) References Cited

FOREIGN PATENT DOCUMENTS

| WO | WO-2022/103822 A1 | 5/2022 |
|---|---|---|
| WO | WO-2022/103824 A1 | 5/2022 |
| WO | WO-2022/103829 A1 | 5/2022 |
| WO | WO-2022/103831 A1 | 5/2022 |

OTHER PUBLICATIONS

Lelewer, Debra A., and Daniel S. Hirschberg. "Data compression." ACM Computing Surveys (CSUR) 19.3 (1987): 261-296. (Year: 1987).*
"vCard Ontology—for describing People and Organizations," W3C Interest Group Note, May 22, 2014, 31 pages.
Balaji et al, "Brick: Towards a Unified Metadata Schema for Buildings," dated Nov. 16-17, 2016, 10 pages.
Balaji et al, "Brick: Metadata schema for portable smart building applications," Applied Energy, 2018 (20 pages).
Balaji et al, "Brick: Metadata schema for portable smart building applications," Applied Energy, Sep. 15, 2018, 3 pages, (Abstract).
Balaji et al, "Demo Abstract: Portable Queries Using the Brick Schema for Building Applications," BuildSys '16, Palo Alto, CA, USA, Nov. 16-17, 2016 (2 pages).
Bhattacharya et al., "Short Paper: Analyzing Metadata Schemas for Buildings—The Good, The Bad and The Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema For Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jue 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, dated Oct. 5, 2017, 11 pages.
International Search Report and Written Opinion on PCT/US2017/052633, dated Oct. 23, 2017, 9 pages.
International Search Report and Written Opinion on PCT/US2017/052829, dated Nov. 27, 2017, 24 pages.
International Search Report and Written Opinion on PCT/US2018/024068, dated Jun. 15, 2018, 22 pages.

(56) References Cited

OTHER PUBLICATIONS

International Search Report and Written Opinion on PCT/US2018/052971, dated Mar. 1, 2019, 19 pages.
International Search Report and Written Opinion on PCT/US2018/052974, dated Dec. 19, 2018, 13 pages.
International Search Report and Written Opinion on PCT/US2018/052975, dated Jan. 2, 2019, 13 pages.
International Search Report and Written Opinion on PCT/US2018/052994, dated Jan. 7, 2019, 15 pages.
International Search Report and Written Opinion on PCT/US2019/015481, dated May 17, 2019, 78 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Nissin Electric Co., Ltd., "Smart power supply system (SPSS)," Outline of the scale verification plan, Nissin Electric Technical Report, Japan, Apr. 23, 2014, vol. 59, No. 1 (23 pages).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, 2021 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work For Your Business: A guide to effective Big Data analytics," Impackt Publishing LTD., Birmingham, UK, Oct. 2014 (170 pages).
The Virtual Nuclear Tourist, "Calvert Cliffs Nuclear Power Plant," URL: http://www.nucleartourist.com/us/calvert.htm, Jan. 11, 2006 (2 pages).
University of California At Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).
Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
W3c, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
White et al., "Reduce building maintenance costs with AWS IoT TwinMaker Knowledge Graph," The Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).
Zhou, Q. et al., "Knowledge-infused and Consistent Complex Event Processing over Real-time and Persistent Streams," Further Generation Computer Systems, 2017, 76 (pp. 391-406).
U.S. Appl. No. 17/566,029, filed Jul. 6, 2023, Passivelogic, Inc.
U.S. Appl. No. 17/567,275, filed Feb. 9, 2022, Passivelogic, Inc.
U.S. Appl. No. 17/722,115, filed Feb. 9, 2022, Passivelogic, Inc.

\* cited by examiner

1000

| Characters | Purposes |
|---|---|
| , | For separating part1, part2, and repeated parts of part2 |
| : | For encoding Entities |
| [ relation ] | For encoding relations |

| Characters | Purposes |
|---|---|
| / | [hasPart] |
| > | [feeds] |

FIG. 11

| Location Entity |||
|---|---|---|
| Type | Part1 Recommendations | Part2 Recommendations |
| Building | Use building names as identifiers (IDs) in entity E0 | Include address and site reference, e.g., [street-address], [locality], [region], [country-name], [postal-code] |
| Floor | Use integers as identifiers (IDs) of entity E0, e.g., Floor:1 rather than Floor:first | |
| Room | Use room number as identifiers (IDs) of entity E0 | |
| HVAC_Zone | Use room number or section number as identifiers (IDs) of entity E0 | |

FIG. 12

| Equipment Entity ||
|---|---|
| Type | Part2 Recommendations |
| AHU | AHU may feed into many VAVs, to keep AHU name length manageable in those cases, instead of encoding [feeds] here in AHU, encode them in Part2 of VAV |

Space:
Building:EBU3B/Floor:2/Room:2144
Building:EBU3B/Floor:2/HVAC_Zone:2144,/Room:2144

1402

Point:
Building:EBU3B/Chilled_Water_System:3B/Pump:4/VFD:4/Power_Meter:4
Building:EBU3B/Chilled_Water_System:3B/Pump:3/VFD:3/Power_Meter:3
Building:EBU3B/AHU:1/Return_Fan:2/VFD:2/Filter:2/Filter_Reset_Command:2
Building:EBU3B/VAV:3242/Cooling_Command:3242
Building:EBU3B/VAV:4106/Reheat_Valve:4106/Reheat_Valve_Command:4106
Building:EBU3B/VAV:4154/Booster_Fan:4154/Booster_Fan_Start_Stop_Command:4154
Building:EBU3B/VAV:1200B/Booster_Fan:1200/Booster_Fan_Start_Stop_Command:1200B
Building:EBU3B/Hot_Water_System:3B/Heat_Exchanger:1/Valve:1/Heat_Exchanger_Valve_Status:1

1404

Equipment:
Building:EBU3B/AHU:1
Building:EBU3B/VAV:4154,>HVAC_Zone:4154,AHU:1>
Building:EBU3B/VAV:275,>HVAC_Zone:275,AHU:1>

| Project Information | ✕ |

Family: [System Family: Project Information ▾] [Load...]

Type: [ ▾] [Edit Type...]

Instance Parameters - Control selected or to-be-created instance

| Parameter | Value |
|---|---|
| Identify Data | ☆ |
| Organization Name | |
| Organization Description | |
| Building Name | Building: 1AlbertQuay| |
| Author | |
| Energy Analysis | ☆ |
| Energy Settings | Edit... |
| General | ☆ |
| NBSSpecificationPath | |
| Other | ☆ ▾ |

[OK] [Cancel]

FIG. 16

```
/Users/userA/.pyenv/versions/3.5.6/bin/python brick_up.py "data/MODEL_0529.ifc"
================================================
Loading IFC Data... data/MODEL_0529.ifc
Processing IFC Data...

Building:1AlbertQuay/Floor:F4/Lobby:front
Building:1AlbertQuay/Floor:F4/Conference_Room:north
Building:1AlbertQuay/Floor:F4/Conference_Room:north/VAV:401,AHU:1>
```

BUILDING SYSTEM WITH NAMING SCHEMA ENCODING ENTITY TYPE AND ENTITY RELATIONSHIPS

BACKGROUND

The present disclosure relates generally to building devices of building systems that operate a building. The present disclosure relates more particularly to building modeling.

Building modeling may represent contextual information regarding a building and may be defined according to various formats. Building equipment and/or building software applications can be built to operate on the different formats. However, because each piece of building equipment or software application may be built for a specific building model format, the use of the building equipment or software applications may be limited to only the specific building model format. Therefore, it would be advantageous for a schema for use in the building equipment or software applications where the universal schema encodes information of any building model format.

SUMMARY

One implementation of the present disclosure is a building system of a building. The building system includes one or more memory devices storing instructions thereon, that, when executed by one or more processors, cause the one or more processors to receive building metadata, the building metadata describing components of the building, generate, based on the building metadata, entities, each of the entities representing one the components, and determine, based on the building metadata, relationships between the entities. The instructions cause the one or more processors to generate metadata strings in a universal building schema, one metadata string of the metadata strings including characters representing a first entity of the entities, one or more second entities of the entities related to the first entity, and one or more relationships between the first entity and the one or more second entities.

In some embodiments, the characters represent each of the one or more relationships with at least one of a single reserved character, the single reserved character linked to a particular relationship of predefined relationships or a character set, the character set representing the particular relationship of the predefined relationships.

In some embodiments, the first entity and the one or more second entities are each represented by one or more type characters representing an entity type and one or more identifier characters identifying a particular instance of the entity type.

In some embodiments, the entity type is a particular entity type of a set of predefined entity types.

In some embodiments, the one metadata string of the metadata strings is referenced by a fully qualified name (FQN), wherein the FQN is an ending entity of the one metadata string.

In some embodiments, a second metadata string of the metadata strings includes a first part represented by first characters, wherein the first part is the FQN, a separation character separating the first part from a second part, and the second part, the second part representing one of one or more other entities related to the one metadata string.

In some embodiments, the building metadata is data of a building information model (BIM). In some embodiments, the BIM is defined by a user and represents the building and the components of the building, wherein the BIM is augmented by the user to include naming data for each of the components according to the universal building schema.

In some embodiments, the BIM is augmented by a user to include a definition of a second part relating a first component of the components to one or more second components of the components. In some embodiments, the instructions cause the one or more processors to generate a particular metadata string of the metadata strings including a first part representing the first component and the second part representing the one or more second components.

In some embodiments, the instructions cause the one or more processors to generate, based on the building metadata, the entities by identifying, based on the BIM, the naming data for each of the components, the naming data representing the entities with an entity type and an entity identifier.

In some embodiments, the instructions cause the one or more processors to determine, based on the building metadata, the relationships between the entities by identifying relational information between the components indicated by the BIM.

In some embodiments, each metadata string of the metadata strings include a first part represented by first characters, wherein the first part represents the first entity, one or more separation characters separating the first part from one or more second parts and the one or more second parts from each other, and the one or more second parts, each of the one or more second parts representing one of the one or more second entities.

In some embodiments, the first entity ordered within the first part with one or more other first entities according to a predefined entity type hierarchy of the universal building schema.

In some embodiments, the predefined entity type hierarchy lists entities according to entity type from a building entity type to a floor entity type to a room entity type to an equipment entity type to a point entity type.

Another implementation of the present disclosure is a method including receiving, by a processing circuit, building metadata, the building metadata describing components of a building, generating, by the processing circuit, based on the building metadata, entities, each of the entities representing one of the components, determining, by the processing circuit, based on the building metadata, relationships between the entities, and generating, by the processing circuit, metadata strings in a universal building schema, one metadata string of the metadata strings including characters representing a first entity of the entities, one or more second entities of the entities related to the first entity, and one or more relationships between the first entity and the one or more second entities.

In some embodiments, the characters represent each of the one or more relationships with at least one of a single reserved character, the single reserved character linked to a particular relationship of predefined relationships or a character set, the character set representing the particular relationship of the predefined relationships.

In some embodiments, the first entity and the one or more second entities are each represented by one or more type characters representing an entity type and one or more identifier characters identifying a particular instance of the entity type.

In some embodiments, the entity type is a particular entity type of a set of predefined entity types.

In some embodiments, the one metadata string of the metadata strings is referenced by a fully qualified name (FQN), wherein the FQN is an ending entity of the one metadata string.

In some embodiments, a second metadata string of the metadata strings includes a first part represented by first characters, wherein the first part is the FQN, a separation character separating the first part from a second part, and the second part, the second part representing one of one or more other entities related to the one metadata string.

Another implementation of the present disclosure is one or more computer readable storage media configured to store instructions thereon, that, when executed by one or more processors, cause the one or more processors to receive building metadata, the building metadata describing components of a building, generate, based on the building metadata, entities, each of the entities representing one of the components, determine, based on the building metadata, relationships between the entities, and generate metadata strings in a universal building schema, one metadata string of the metadata strings including characters representing a first entity of the entities, one or more second entities of the entities related to the first entity, and one or more relationships between the first entity and the one or more second entities.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 10 is a table illustrating reserved characters of the universal naming schema, according to an exemplary embodiment.

FIG. 11 is a table illustrating reserved characters representing relationships in the universal naming schema, according to an exemplary embodiment.

FIG. 12 is a table illustrating exemplary types of location entities of the universal naming schema, according to an exemplary embodiment.

FIG. 13 is a table illustrating an exemplary equipment entity of the universal naming schema, according to an exemplary embodiment.

FIG. 14 is a set of example strings in the universal naming schema representing spaces, points, and equipment, according to an exemplary embodiment.

FIG. 16 is a user interface of a building information modeling (BIM) tool where a building name is entered into the user interface in the universal naming schema, according to an exemplary embodiment.

FIG. 22 is an output illustrating the result of a script that processes an Industry Foundation Classes (IFC) file into strings of the universal naming schema, according to an exemplary embodiment.

DETAILED DESCRIPTION

Overview

Figure 1:
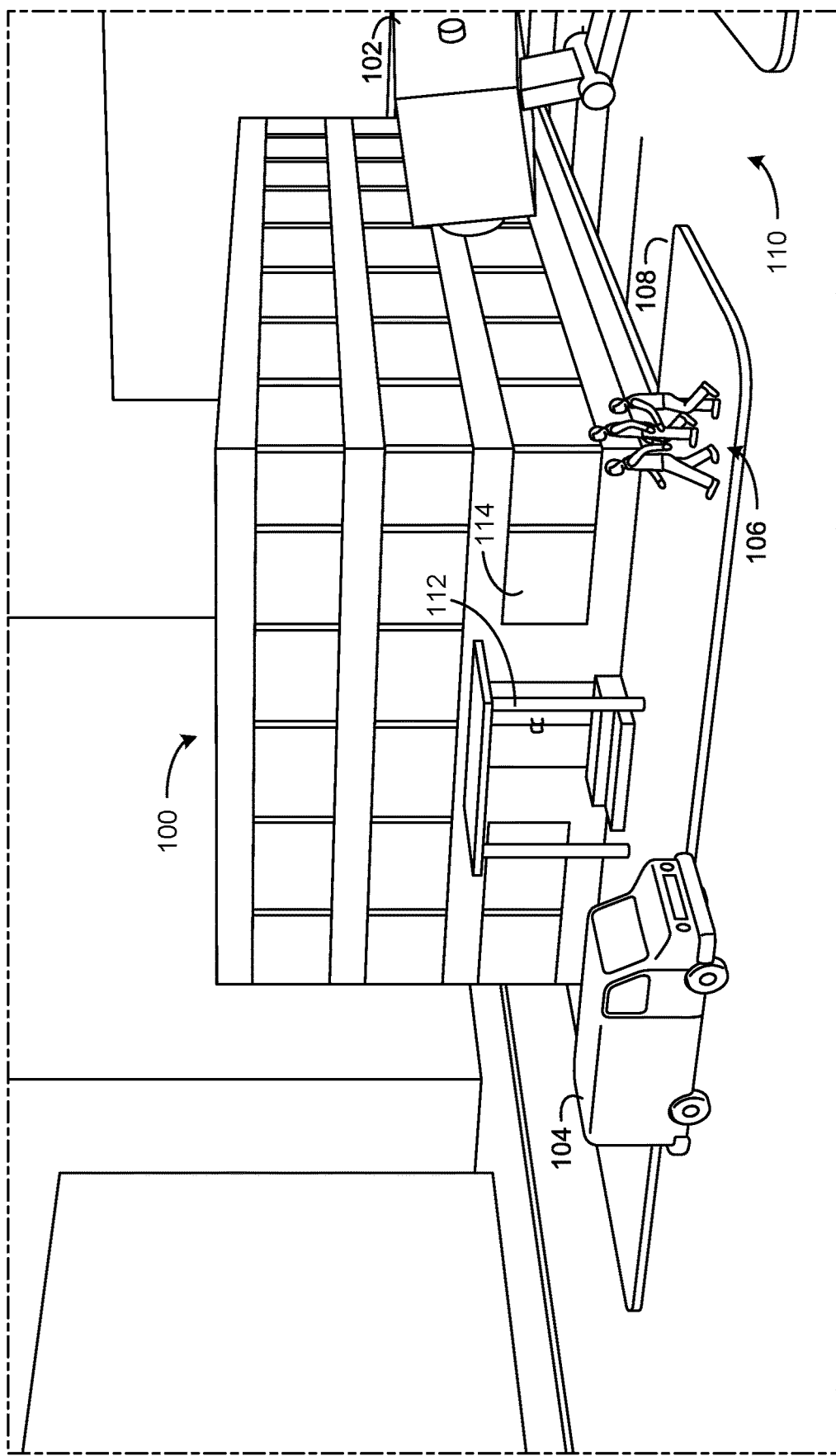
FIG. 1 is a perspective view schematic drawing of a building with building systems, according to an exemplary embodiment.

Referring generally to the FIGURES, systems and methods for a universal naming schema that encodes entity types and entity relationships for a building are shown, according to various exemplary embodiments. The universal naming schema can be a schema that can universally encode, in a single string, types and relationships of an entity in any building data format such as BACnet, BRICK, or Building Information Modeling (BIM). Entities may be data points (e.g., sensor points, actuator points, virtual points calculated from measured points), pieces of equipment (e.g., thermostats, boilers, chillers, air handler units (AHUs), variable air volume (VAV) units, controllers, etc.), spaces (e.g., rooms, zones, buildings, lobbies), people (building owners, tenants, office personal, etc.), and/or any other type of entity.

In some embodiments, the building system is configured to construct one or more strings in the universal naming schema that define the entity, the entity type, and the relationships between the entities. In some embodiments, the building system is configured to generate strings in the universal schema from manually entered information. For example, in some embodiments, a user may define each entity, the type of each entity, and relationships between each entity in a user interface. In some embodiments, the building system is configured to automatically construct the strings from one or more data sources. Data sources may be IFC files, BACnet objects, etc. In some embodiments, the building system is configured to receive data such as BACnet objects and is configured to extract the entities, entity types, and entity relationships from the BACnet objects and construct the strings in the universal naming schema.

In some embodiments, building applications can directly consume and/or operate based on one or more strings in the universal naming schema. Furthermore, when entities in buildings are named following the universal naming schema, the strings formatted in the universal naming schema can be translated into knowledge or space graphs that are consumed by the building applications. In some embodiments, the universal naming schema can be integrated with specific building systems, tools, and/or software processes. In some embodiments, the universal naming schema defines all the necessary elements and/or parts that could be used directly for integration with the building systems, tools, and/or software processes. In some embodiments, the vocabularies utilized in the universal naming schema are defined in BRICK, a unified semantic representation of building resources.

With respect to BACnet, it may be difficult for a user to understand the vocabulary used to define elements of the BACnet. However, the universal naming schema may provide a user readable schema. Because the universal naming schema is human readable and includes rich data, a user or system may gain greater information reading the universal naming schema as compared to BACnet where there are numeric values that do not provide significant contextual information. Furthermore, BACnet may have a limited number of available characters and/or character sets which reduce the amount of information that can be included with the BACnet. This is addressed by the context rich structure of the universal naming schema.

The universal naming schema can include a significant amount of information without needing a significant amount of characters. For example, the phrase, "hasLocation" could be represented by the character "@". Furthermore, the character set "measures" could be represented by the character "?". Furthermore, characters in the universal naming schema might not be legal in BACnet. In some embodiments, a building system can be configured to select an optimal small number of point names in the universal naming schema. In some embodiments, a query that retrieves strings in the universal naming schema may return more information in a single query (e.g., an entire string of elements) than compared to multiple queries in other systems. Without returning the entire string, a system might have to make multiple queries for each element.

It may be difficult to translate BRICK (e.g., RDF and/or turtle data) into BACnet. However, the universal naming schema may provide a method for translating BRICK data into BACnet. For example, data in the universal naming schema can be translated into BACnet without requiring a significant amount of processing. Furthermore, the BACnet data can be translated back into the universal naming schema without requiring a significant amount of processing.

Building with Building Systems

Referring now to FIG. 1, a building 100 with a security camera 102 and a parking lot 110 is shown, according to an exemplary embodiment. The building 100 is a multi-story commercial building surrounded by or near the parking lot 110 but can be any type of building in some embodiments. The building 100 can be a school, a hospital, a store, a place of business, a residence, an apartment complex, a hotel, an office building, etc. The building 100 may be associated with the parking lot 110.

Both the building 100 and the parking lot 110 are at least partially in the field of view of the security camera 102. In some embodiments, multiple security cameras 102 may be used to capture the entire building 100 and parking lot 110 not in (or in to create multiple angles of overlapping or the same field of view) the field of view of a single security camera 102. The parking lot 110 can be used by one or more vehicles 104 where the vehicles 104 can be either stationary or moving (e.g. delivery vehicles). The building 100 and parking lot 110 can be further used by one or more pedestrians 106 who can traverse the parking lot 110 and/or enter and/or exit the building 100. The building 100 may be further surrounded or partially surrounded by a sidewalk 108 to facilitate the foot traffic of one or more pedestrians 106, facilitate deliveries, etc. In other embodiments, the building 100 may be one of many buildings belonging to a single industrial park, shopping mall, or commercial park having a common parking lot and security camera 102. In another embodiment, the building 100 may be a residential building or multiple residential buildings that share a common roadway or parking lot.

The building 100 is shown to include a door 112 and multiple windows 114. An access control system can be implemented within the building 100 to secure these potential entrance ways of the building 100. For example, badge readers can be positioned outside the door 112 to restrict access to the building 100. The pedestrians 106 can each be associated with access badges that they can utilize with the access control system to gain access to the building 100 through the door 112. Furthermore, other interior doors within the building 100 can include access readers. In some embodiments, the doors are secured through biometric information, e.g., facial recognition, fingerprint scanners, etc. The access control system can generate events, e.g., an indication that a particular user or particular badge has interacted with the door. Furthermore, if the door 112 is forced open, the access control system, via door sensor, can detect the door forced open (DFO) event.

The windows 114 can be secured by the access control system via burglar alarm sensors. These sensors can be configured to measure vibrations associated with the window 114. If vibration patterns or levels of vibrations are sensed by the sensors of the window 114, a burglar alarm can be generated by the access control system for the window 114.

The building 100 can further include HVAC systems. For example, waterside systems, airside systems, building management systems, and/or various other HVAC systems can be included within the building 100. For example, equipment such as chillers, boilers, rooftop units, air handler units, thermostats, sensors, actuators, dampers, valves, and other equipment can be implemented within the building 100 to control the environmental conditions of the building 100. Examples of building equipment that can be implemented within the building 100 can be found in U.S. patent application Ser. No. 16/048,052 filed Jul. 27, 2018, the entirety of which is incorporated by reference herein.

Figure 2:
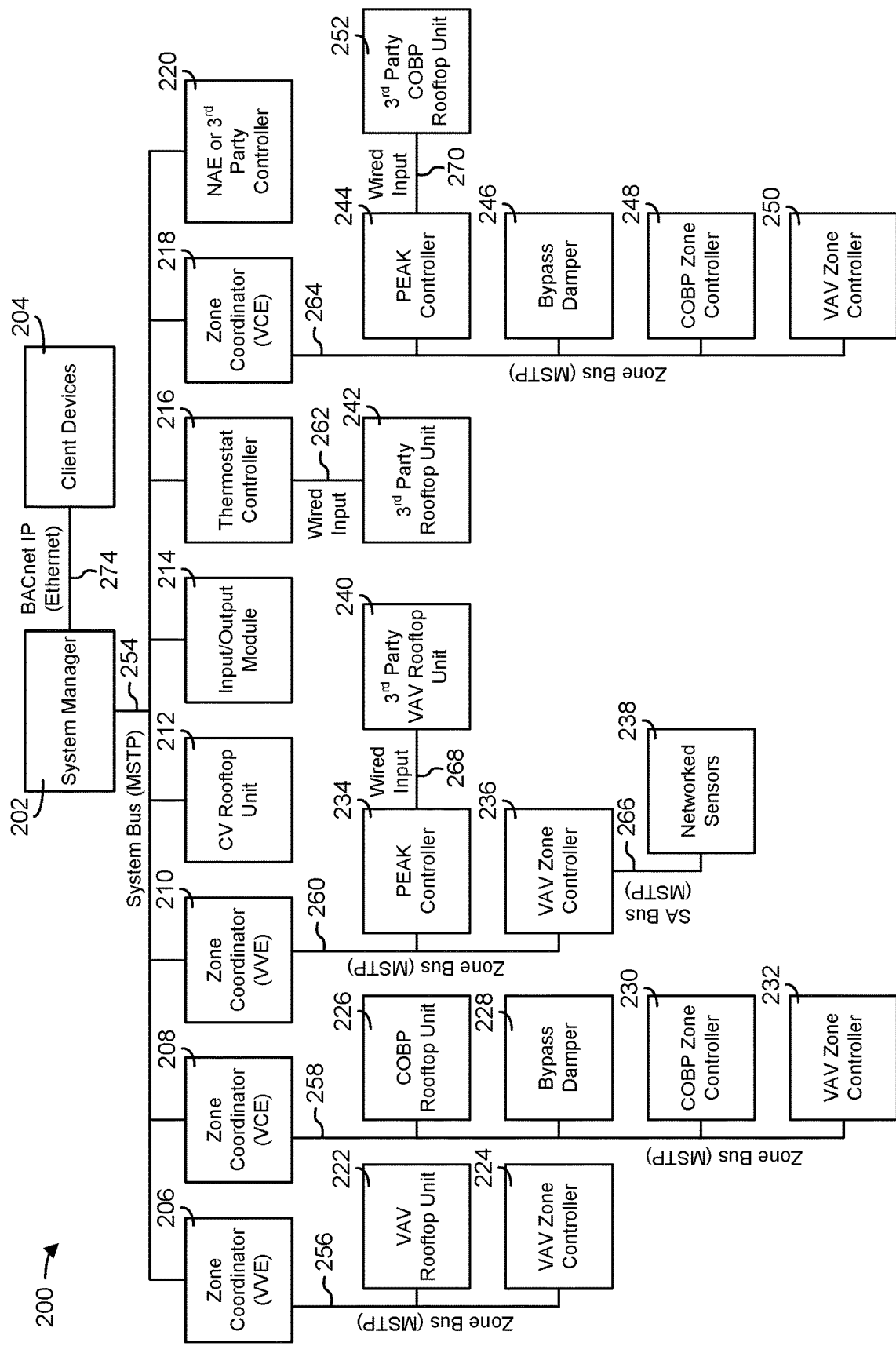
FIG. 2 is a block diagram of a BMS which can be used to monitor and control the building of FIG. 1, according to some embodiments.

Referring now to FIG. 2, a block diagram of a building management system (BMS) 200 is shown, according to some embodiments. BMS 200 can be used to monitor and control the devices of an HVAC system, a waterside system, an airside system, building subsystems, as well as other types of BMS devices (e.g., lighting equipment, security equipment, etc.) and/or HVAC equipment.

BMS 200 provides a system architecture that facilitates automatic equipment discovery and equipment model distribution. Equipment discovery can occur on multiple levels of BMS 200 across multiple different communications busses (e.g., a system bus 254, zone buses 256-260 and 264, sensor/actuator bus 266, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 200 can begin interacting with the new device (e.g., sending control signals, using data from the device) without user interaction.

Some devices in BMS 200 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 200 store their own equipment models. Other devices in BMS 200 have equipment models stored externally (e.g., within other devices). For example, a zone coordinator 208 can store the equipment model for a bypass damper 228. In some embodiments, zone coordinator 208 automatically creates the equipment model for bypass damper 228 or other devices on zone bus 258. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 2, BMS 200 is shown to include a system manager 202; several zone coordinators 206, 208, 210 and 218; and several zone controllers 224, 230, 232, 236, 248, and 250. System manager 202 can monitor data points in BMS 200 and report monitored variables to various monitoring and/or control applications. System manager 202 can communicate with client devices 204 (e.g., user devices, desktop computers, laptop computers, mobile devices, etc.) via a data communications link 274 (e.g., BACnet IP, Ethernet, wired or wireless communications, etc.). System manager 202 can provide a user interface to client devices 204 via data communications link 274. The user interface may allow users to monitor and/or control BMS 200 via client devices 204.

In some embodiments, system manager 202 is connected with zone coordinators 206-210 and 218 via a system bus 254. System manager 202 can be configured to communicate with zone coordinators 206-210 and 218 via system bus 254 using a master-slave token passing (MSTP) protocol or any other communications protocol. System bus 254 can also connect system manager 202 with other devices such as a constant volume (CV) rooftop unit (RTU) 212, an input/output module (TOM) 214, a thermostat controller 216 (e.g., a TEC2000 series thermostat controller), and a network automation engine (NAE) or third-party controller 220. RTU 212 can be configured to communicate directly with system manager 202 and can be connected directly to system bus 254. Other RTUs can communicate with system manager 202 via an intermediate device. For example, a wired input 262 can connect a third-party RTU 242 to thermostat controller 216, which connects to system bus 254.

System manager 202 can provide a user interface for any device containing an equipment model. Devices such as zone coordinators 206-210 and 218 and thermostat controller 216 can provide their equipment models to system manager 202 via system bus 254. In some embodiments, system manager 202 automatically creates equipment models for connected devices that do not contain an equipment model (e.g., IOM 214, third party controller 220, etc.). For example, system manager 202 can create an equipment model for any device that responds to a device tree request. The equipment models created by system manager 202 can be stored within system manager 202. System manager 202 can then provide a user interface for devices that do not contain their own equipment models using the equipment models created by system manager 202. In some embodiments, system manager 202 stores a view definition for each type of equipment connected via system bus 254 and uses the stored view definition to generate a user interface for the equipment.

Each zone coordinator 206-210 and 218 can be connected with one or more of zone controllers 224, 230-232, 236, and 248-250 via zone buses 256, 258, 260, and 264. Zone coordinators 206-210 and 218 can communicate with zone controllers 224, 230-232, 236, and 248-250 via zone busses 256-260 and 264 using a MSTP protocol or any other communications protocol. Zone busses 256-260 and 264 can also connect zone coordinators 206-210 and 218 with other types of devices such as variable air volume (VAV) RTUs 222 and 240, changeover bypass (COBP) RTUs 226 and 252, bypass dampers 228 and 246, and PEAK controllers 234 and 244.

Zone coordinators 206-210 and 218 can be configured to monitor and command various zoning systems. In some embodiments, each zone coordinator 206-210 and 218 monitors and commands a separate zoning system and is connected to the zoning system via a separate zone bus. For example, zone coordinator 206 can be connected to VAV RTU 222 and zone controller 224 via zone bus 256. Zone coordinator 208 can be connected to COBP RTU 226, bypass damper 228, COBP zone controller 230, and VAV zone controller 232 via zone bus 258. Zone coordinator 210 can be connected to PEAK controller 234 and VAV zone controller 236 via zone bus 260. Zone coordinator 218 can be connected to PEAK controller 244, bypass damper 246, COBP zone controller 248, and VAV zone controller 250 via zone bus 264.

A single model of zone coordinator 206-210 and 218 can be configured to handle multiple different types of zoning systems (e.g., a VAV zoning system, a COBP zoning system, etc.). Each zoning system can include a RTU, one or more zone controllers, and/or a bypass damper. For example, zone coordinators 206 and 210 are shown as Verasys VAV engines (VVEs) connected to VAV RTUs 222 and 240, respectively. Zone coordinator 206 is connected directly to VAV RTU 222 via zone bus 256, whereas zone coordinator 210 is connected to a third-party VAV RTU 240 via a wired input 268 provided to PEAK controller 234. Zone coordinators 208 and 218 are shown as Verasys COBP engines (VCEs) connected to COBP RTUs 226 and 252, respectively. Zone coordinator 208 is connected directly to COBP RTU 226 via zone bus 258, whereas zone coordinator 218 is connected to a third-party COBP RTU 252 via a wired input 270 provided to PEAK controller 244.

Zone controllers 224, 230-232, 236, and 248-250 can communicate with individual BMS devices (e.g., sensors, actuators, etc.) via sensor/actuator (SA) busses. For example, VAV zone controller 236 is shown connected to networked sensors 238 via SA bus 266. Zone controller 236 can communicate with networked sensors 238 using a MSTP protocol or any other communications protocol. Although only one SA bus 266 is shown in FIG. 2, it should be understood that each zone controller 224, 230-232, 236, and 248-250 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 224, 230-232, 236, and 248-250 can be configured to monitor and control a different building zone. Zone controllers 224, 230-232, 236, and 248-250 can use the inputs and outputs provided via their SA busses to monitor and control various building zones. For example, a zone controller 236 can use a temperature input received from networked sensors 238 via SA bus 266 (e.g., a measured temperature of a building zone) as feedback in a temperature control algorithm. Zone controllers 224, 230-232, 236, and 248-250 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Figure 3:
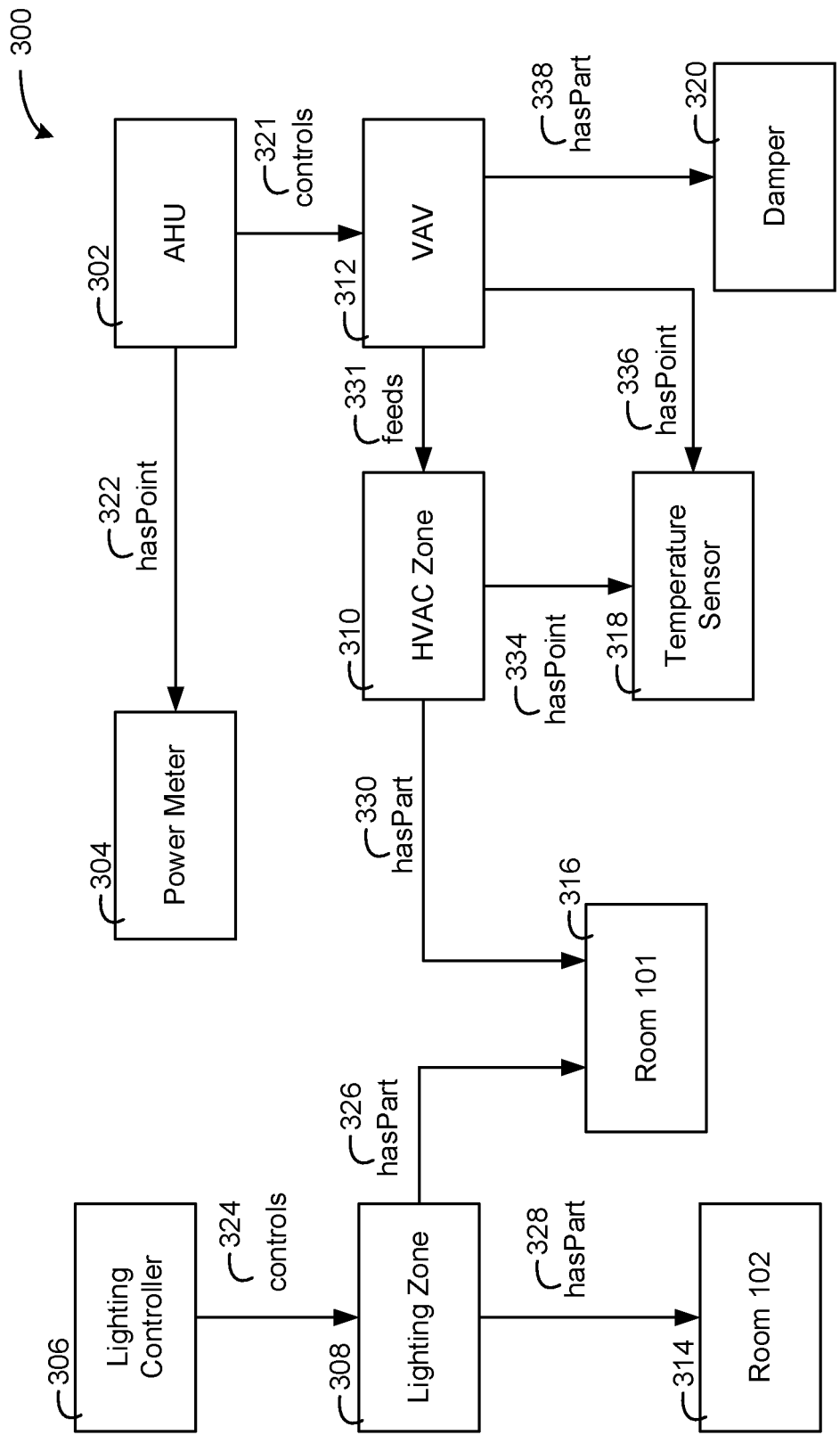
FIG. 3 is a block diagram of a graph including nodes and edges representing building entities and the relationships between the building entities, according to an exemplary embodiment.

Referring now to FIG. 3, a graph 300 including nodes and edges representing building entities and the relationships between the building entities, according to an exemplary embodiment. The graph 300 can be in a BRICK schema. BRICK may be a schema that defines entity types and entity relationships. Details regarding BRICK can be found in the Publication "Brick: Towards a Unified Metadata Schema For Buildings" to Balaji et al., which is incorporated by reference herein in its entirety. The graph 300 includes entities 302-320 and relationships 322-338. The entities 302-320 are equipment and spaces. However, the entities 302-320 can further be people, vehicles, buildings, events (e.g., a threat, an active shooter, a calendar meeting, a weather storm), resources (e.g., water, steam, electricity, etc.), etc.

In some embodiments, the entities 302-320 are nodes of a graph while the relationships 322-338 are edges of the graph. The relationships 322-338 represent semantic relationships between the entities 302-320. The relationships 322-338 can be directional, i.e., represent a relationship between a first entity and a second entity. In some embodiments, the relationships 322-338 can be bidirectional, i.e., a first relationship between the first entity and the second entity and a second relationship between the second entity and the first entity. In some embodiments, the relationships 322-338 are defined according to types and are identified with words and/or phrases.

The entities include an air handler unit (AHU) entity 302 that "hasPoint" relationship 322 to a power meter entity 304. The AHU entity 302 has a "controls" relationship 3211 to a VAV entity 312. The VAV entity 312 includes components, represented by a damper entity 320 and a "hasPart" relationship 338 between the VAV entity 312 and the damper entity 320. The VAV entity 312 also has a point. The point is represented by a temperature sensor entity 318. A "hasPoint" relationship 336 between the VAV entity 312 and the temperature sensor entity 318 indicates that the VAV has the temperature sensor point.

Furthermore, the VAV entity 312 operates a particular area of a building, i.e., the VAV entity 312 feeds, represented by the "feeds" relationship 331, the HVAC zone entity 310. The HVAC zone entity 310 represents a zone that includes a room, i.e., room 101 entity 316. The relationship between the HVAC zone and the room 101 is represented by the "hasPart" relationship 330 between the HVAC zone entity 310 and the room 101 entity 316. The room 101 is further part of a lighting zone represented by lighting zone entity 308. A "hasPart" relationship 326 between the lighting zone entity 308 and the room 101 entity 316 indicates that the room 101 is part of the lighting zone.

Furthermore, the lighting zone includes another room, a room 102. This is represented by the lighting zone entity 308, the room 102 entity 314, and the "hasPart" relationship 328 between the lighting zone entity 308 and the room 102 entity 314. Finally, a lighting controller is configured to control lighting in the lighting zone. This is represented by the lighting controller entity 306 and the "controls" relationship 324 between the lighting controller entity 306 and the lighting zone entity 308.

Universal Naming Schema

Figure 4:
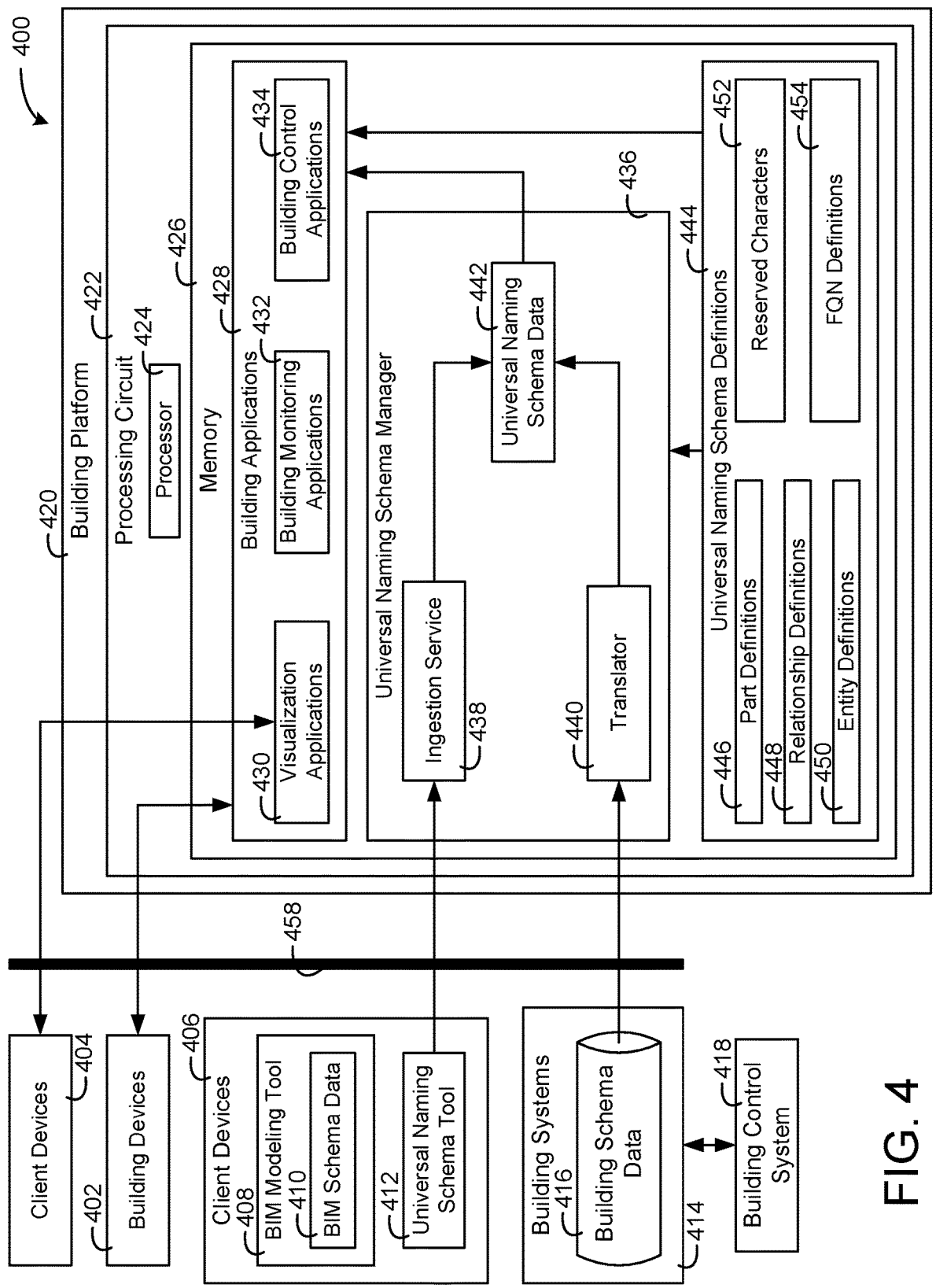
FIG. 4 is a block diagram of a system including a building platform for encoding entity type and entity relationships in a universal naming schema, according to an exemplary embodiment.

Referring now to FIG. 4 a system 400 is shown including a building platform 420 configured to encode entity type and entity relationships in a universal naming schema, according to an exemplary embodiment. The system 400 further includes client devices 404, building devices 402, client devices 406, building systems 414, and a building control system 418. The building platform 420 can receive data in various formats (e.g., manual user input, BACnet objects, BRICK data, IFC files, etc.) and construct one or more strings that encode entity type and entity relationships in the universal naming schema based on the received data. The data can be received from the client devices 404, the building devices 402, the client devices 406, the building systems 4124, and/or the building control system 418.

The client devices 404, the building devices 402, the client devices 406, the building systems 414, and/or the building platform 420 can communicate via a network 458. The network 458 can include network components (e.g., routers, switches, transceivers, range extenders, coordinators, etc.) for implementing LANs, wide area networks (WANs), metropolitan area networks (MANs), the Internet, Zigbee, Bluetooth, CAN, BACnet, etc.), in some embodiments.

The building platform 420 includes a processing circuit 422. The processing circuit 422 includes a processor 424 and a memory 436. Although only one processor and one memory are shown in FIG. 4, the building platform 420 can include any number of processors and/or memories. The processor 424 can be a general purpose or specific purpose processor, an application specific integrated circuit (ASIC), one or more field programmable gate arrays (FPGAs), a group of processing components, or other suitable processing components. The processor 424 may be configured to execute computer code and/or instructions stored in the memory 426 or received from other computer readable media (e.g., CDROM, network storage, a remote server, etc.).

The memory 426 can include one or more devices (e.g., memory units, memory devices, storage devices, etc.) for storing data and/or computer code for completing and/or facilitating the various processes described in the present disclosure. The memory 426 can include random access memory (RAM), read-only memory (ROM), hard drive storage, temporary storage, non-volatile memory, flash memory, optical memory, or any other suitable memory for storing software objects and/or computer instructions. The memory 426 can include database components, object code components, script components, or any other type of information structure for supporting the various activities and information structures described in the present disclosure. The memory 426 can be communicably connected to the processor 424 and can include computer code for executing (e.g., by the processor 424) one or more processes described herein. The memory 426 can include multiple components (e.g., software modules, computer code, etc.) that can be performed by the processor 424 (e.g., executed by the processor 424).

The memory 426 includes building applications 428, a universal naming schema manager 426, and universal naming schema definitions 444. The universal naming schema manager 436 includes an ingestion service 438, a translator 440, and universal naming schema data 442. The universal naming schema manager 436 can be configured to receive data, e.g., from a universal naming schema tool 412 that is manually entered by a user of the client devices 406, or alternatively building schema data 416 that the building systems 414 may store and/or operate on. The universal naming schema manager 436 can generate the universal naming schema data 442 based on the data entered via the universal naming schema tool 412 and/or via the building schema data 416.

The ingestion service 438 can receive data identifying entity names, entity types, and/or relationships between the entities via the universal naming schema tool 412. The ingestion service 438 can compile the data into the universal naming schema. The ingestion service 438 can translate the data received from the universal naming schema tool 408 into the universal naming schema based on the universal naming schema definition 444 that defines the format and/or character assignments for the universal naming schema. Similarly, the ingestion service 438 can receive manually entered data as BIM schema data 410. A BIM modeling tool 408 that allows a user to generate and/or edit a BIM model (e.g., an IFC model) can allow a user to enter entity names, entity types, and/or entity relationships according to the universal naming schema. The BIM schema data 410 can be ingested by the ingestion service 438 and converted into the universal naming schema data 442 by the ingestion service 438.

In some embodiments, the building systems 414 may store and/or operate on building schema data 416. The building schema data 416 can be BRICK data, BACnet data, IFC data, BIM data, and/or any other data schema that defines entities, entity types, and/or infer relationships. The translator 440 can extract and/or infer the entities, entity types, and/or entity relationships from the building schema data 416 and convert the building schema data 416 into the universal naming schema data 442. Extracting entity names, entity types, and/or entity relationships from building data such as BACnet is described in U.S. patent application Ser. No. 16/663,623 filed Oct. 25, 2019, the entirety of which is incorporated by reference herein.

The universal naming schema data 442 may be one or multiple strings that represent entities, entity types, and/or entity relationships. One string may be configured to represent a first entity, a type of the first entity, and/or relationships to other entities of the first entity. The universal naming schema data 442 can be in a format defined by the universal naming schema definitions 444. The definitions 444 include part definitions 446, relationship definitions 448, entity definitions 450, reserved characters 452, and FQN definitions 454.

The part definitions 446 can include definitions for parts of the strings of the universal naming schema data 442. Each part may be a substring of a string. For example, the part definitions 446 can include a first part and a second part. The first part can define a particular entity and a type of the entity. The second part can identify entities related to the particular entity and the type of those entities. Parts are shown in greater detail in FIG. 5.

The relationship definitions 448 indicate the various relationships that can be defined between entities. The relationships of the relationship definitions 448 can be relationships such as "feeds," "controls," "hasPart," etc. The relationships can be relationships defined according to the BRICK schema.

The entity definitions 450 can define the entities of the universal naming schema data 442. The entity definitions 450 include indications of the various types of entities, e.g., VAVs, AHUs, lighting controllers, zones, rooms, etc. The entity types can be entity types defined according to the BRICK schema. The entity definitions 450 can be names or acronyms describing a defined set of entities.

The reserved characters 452 can be characters that are reserved to represent particular meanings within the string. For example, the character, ":", may be used to encode an entity and an entity type. For example, "AHU_3:AHU" could indicate that an "AHU_3," a name of a particular entity, is of an entity type, "AHU." For example, some characters may be reserved to define relationships as defined according to the relationship definitions 448. For example, the character "/" may represent a "hasPart" relationship. The fully qualified name (FQN) definitions 454 can be a section of the string that uniquely identifies an entity. Other entities can utilize the FQN to reference themselves. FQNs are described in greater detail in FIG. 9.

The building applications 428 include visualization applications 430, building monitoring applications 432, and building control applications 434. The visualization applications 430 generate one or more user interfaces that present visualizations to an end user based on the universal naming schema data 442. In some embodiments, the visualization applications 430 cause a user interface of the client devices 404 to display information based on the universal naming schema data 442. For example, the visualization applications 430 can render a graph data structure for display via the universal naming schema data 442. In some embodiments, visual BIM representations can be rendered for display, at least partly based on the universal naming schema data 442.

The building monitoring applications 432 can be applications that operate on the universal naming schema data 442 to monitor the building devices 402 and/or the building control system 418. For example, the building monitoring applications 432 can organize data based on the relationships encoded in the universal naming schema data 442. In some embodiments, the building monitoring applications 432 can perform fault detection and diagnostics. The fault detection and diagnostics can be performed based on operational data collected from the building devices 402 and/or the building control system 418 and the universal naming schema data 442.

The building control applications 434 can operate to control the building devices 402 and/or the building control system 418. The building control applications 434 can generate operating settings (e.g., motor speeds, duct pressure setpoints, temperature setpoints, damper positions, etc.) and communicate the operating settings to the building devices 402 and/or the building control system 418. The building control applications 434 can generate the settings based on the universal naming schema data 442.

Figure 5:
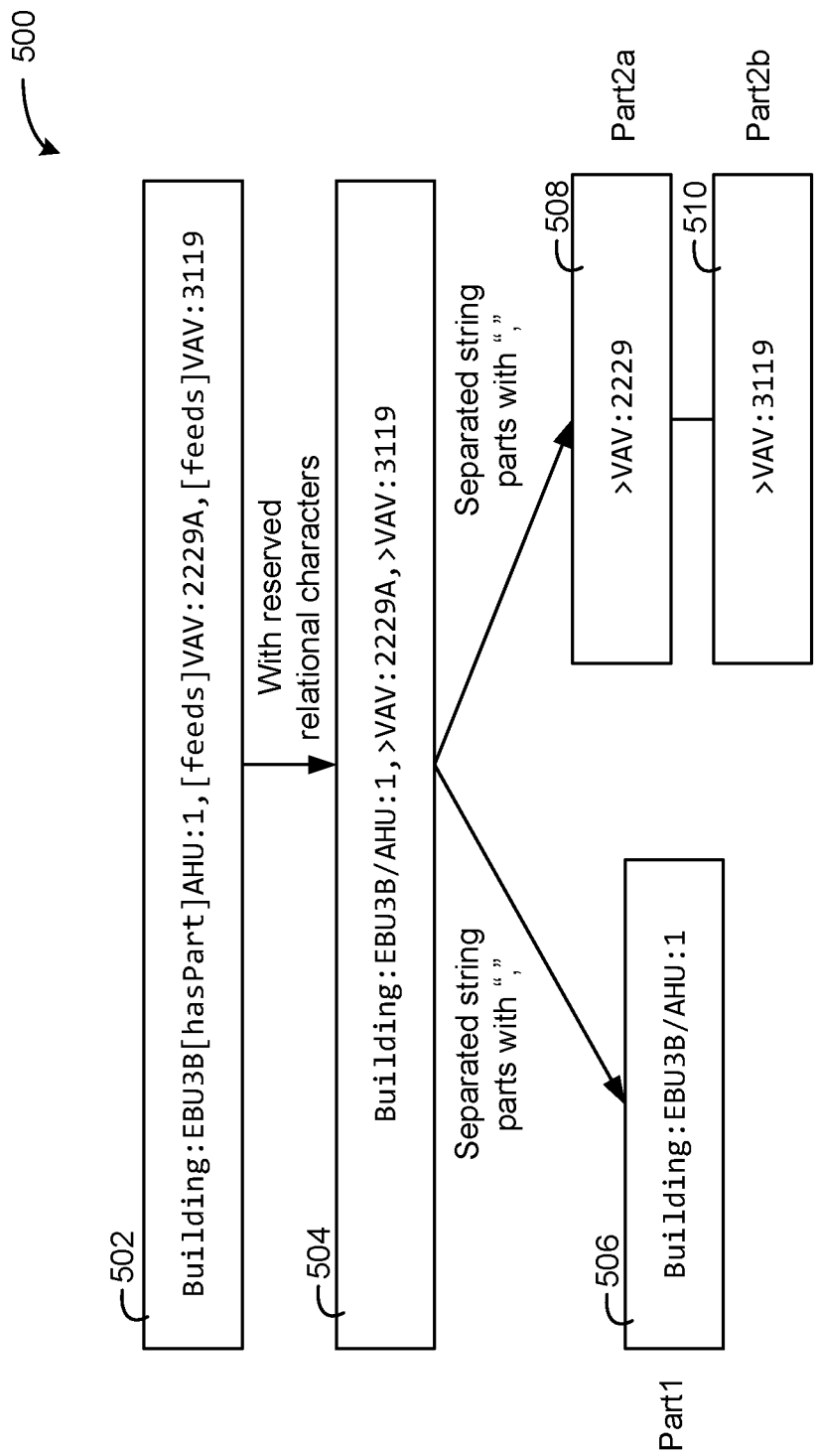
FIG. 5 is a block diagram illustrating parts of a string in the universal naming schema, according to an exemplary embodiment.

Referring now to FIG. 5, a block diagram 500 illustrating parts of a string 502 in the universal naming schema is shown, according to an exemplary embodiment. The string 502 identifies entities of type "Building," "AHU," and "VAV." Furthermore, the string 502 includes names for each entity defined with the character ":". For example, "AHU:1" defines an entity of name "1" and of entity type "AHU." Furthermore, the relationships between the entities are shown in brackets. For example, a relationship "[hasPart]" is included in the string 502. The character "," separates the various parts of the string 502, i.e., the first part 506 from the second parts 508 and 510 respectively.

The string 504 illustrates the string 502 reduced in size with reserved relational characters. The characters "/" and ">" represent the relationships "[hasPart]" and "[feeds]" respectively. The string 502, with the relationships "[hasPart]" and "[feeds]" replaced with the reserved relational characters, is the string 504.

The universal naming schema has two parts separated by a comma in the format, "Part1,Part2." "Part1" is referred to herein as the first part while "Part2" is referred to herein as the second part. The first part and the second part can each be a portion or sub-string of a string, i.e., different components of a particular string. The second part can further divided into one or more sub-parts also separated by commas in the format, "Part2a, Part2b, Part2c, . . . " (e.g., the second part 508 and the second part 510). In those cases, the strings may be in the form of, "Part1." As shown in FIG. 5, for the string 504, i.e., "Building:EBU3B/AHU:1,>VAV:2229A,>VAV:3119," the first part 506 is "Building:EBU3B/AHU:1" while the two second part elements, i.e., second parts 508 and 510, are ">VAV:2229" and ">VAV:3119."

Figure 6:
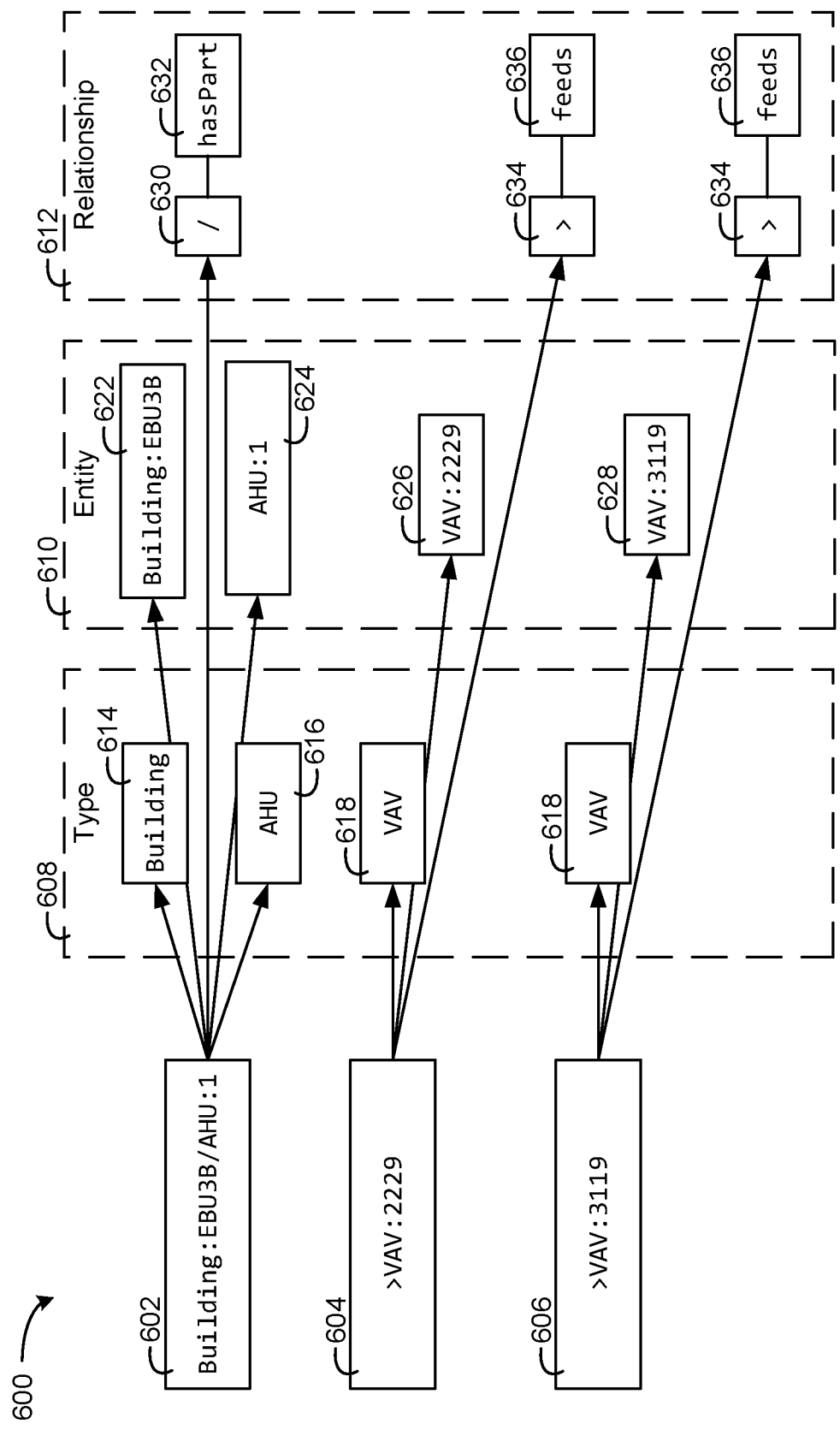
FIG. 6 is a block diagram illustrating type, entity, and relationship encoded in three strings in the universal naming schema, according to an exemplary embodiment.

Referring now to FIG. 6, a block diagram 600 illustrating entity types, entities, and relationships encoded in three strings in the universal naming schema is shown, according to an exemplary embodiment. The different parts of the stings in the universal naming schema, i.e., the first part and the second part, can be assembled from three elements, i.e., type 608, entity 610, and relationship 612.

The types 608 can include a predefined set of strings that represent common elements of a building. For example, the types may be the buildings, rooms, zones, controllers, VAVs, thermostats, AHUs, etc. In some embodiments, the type 608 can be a type defined in BRICK schema. Some entity types might be "AHU_Automatic_Mode_Command," "Building," "AHU," or "VAV." The entity 610 can be defined as "T:ID" where T is the type and ID is an identifier, e.g., an entity name. The identifier can be a string that a user or system provides to uniquely identify a particular entity. Examples of entities formed with a type and an identifier may be "Building:EBU3B," "VAV:2229," and "AHU_Automatic_Mode_Command:c1."

The relationships 612 can include a predefined set of strings that represent common relationships between components a building. The relationship 612 is defined in the format "[relationship]." The relationship 612 can be defined in the BRICK schema. For example, the relationship 612 can be "[hasPart]," "[hasPoint]," and "[feeds]." In some embodiments, an application specific table could be defined to map frequently used relationships to a shortcut character. For example, the character "/" could be mapped to the "[hasPart]" relationship while ">" could be mapped to "[feeds]" relationship.

Three strings 602-606 are shown in the block diagram 600, the string 602 is "Building:EBU3B/AHU:1." The second string 604 is ">VAV:2229." The third string 606 is ">VAV:3119." The type 608 for the string 602 is shown as building 614 and AHU 616. The type 608 for the string 604 is shown as VAV 618. The type 608 for the string 606 is shown as VAV 618.

Furthermore, each entity of the strings 602-606 is defined in each string. Each entity includes a name and a reference to the entity type. For example, for entity 622, "Building:EBU3B," the name is EBU3B identifying a unique instance of the entity type "Building." Similarly, for the entity 624, the entity name is "1" while the entity type is "AHU," resulting in an entity "AHU:1." The entities 626 and 628 define the entities of the strings 604 and 606 respectively.

Each of the strings 602-606 include a relationship. In the string 602, the relationship 632 is the character 630, "/". The character "/" encodes the relationships 634, i.e., "hasPart." In the strings 604 and 606, the relationships 634 are both the character, ">". The character ">" encodes the relationships 636, i.e., "feeds" for the strings 604 and 606.

Figure 7:
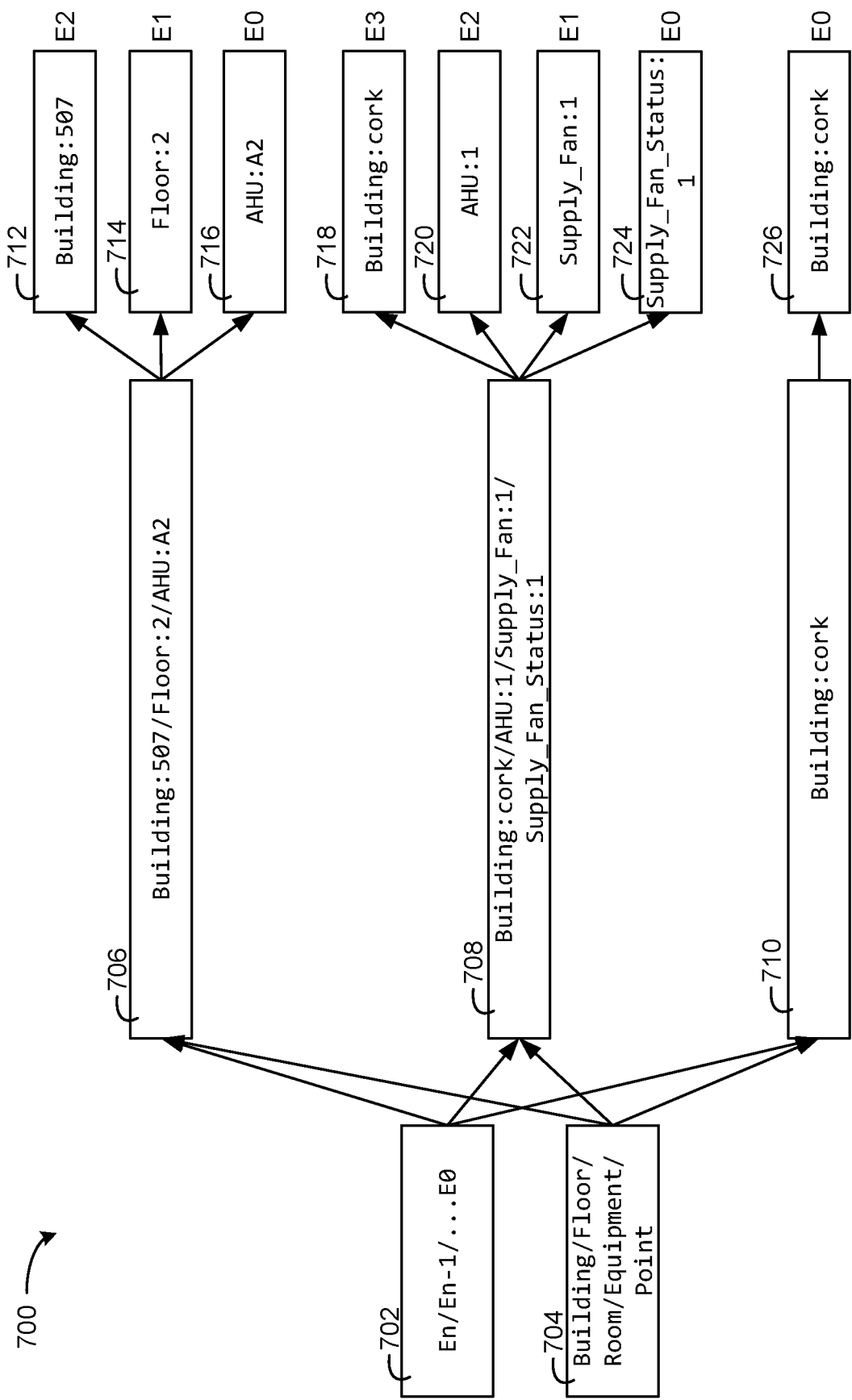
FIG. 7 is a block diagram illustrating a hierarchy of entities of strings in the universal naming schema, according to an exemplary embodiment.

Referring now to FIG. 7, a block diagram 700 illustrating a hierarchy of the entities of strings in the universal naming schema is shown, according to an exemplary embodiment. In the universal naming schema, the first part can uniquely define an entity based on a hierarchical structure. The hierarchical structure can be location, equipment, and entity. The first part can encode the physical location and equipment relationships of an entity, as well as the type of the entity and the identifier, i.e., the name of the entity.

The block diagram 700 includes an entity hierarchy 702 of entities from entity En to entity E0. The entity hierarchy 702 can indicate the format "En/En−1/ . . . E1/." The entities can be equipment, point, space, or any other type of entity. Entity E0 defines the main entity (i.e., entity type and entity identifier) that is described by a particular string. Furthermore, the entity type hierarchy 704 defines the order of entities in the string by type, i.e., building, floor, room, equipment, and point. The locations of the entity type hierarchy 704 may be the physical location of an entity and may be separate from the location that the entity controls or feeds. The strings 706-710 are in the hierarchy formats defined by the hierarchies 702 and 704. The string 706 is "Building:507/Floor:2/AHU:A2." The string 708 is "Building:cork/AHU:1/Supply_Fan:1/Supply_Fan_Status:1." The string 710 is "Building:cork."

The string 706 is built up of three entities 712-716, i.e., "Building:507," "Floor:2," and "AHU:A2." The string 708 is built up of four entities 718-724, i.e., "Building:cork," "AHU:1," "Supply_Fan:1," and "Supply_Fan_Status:1." The string 710 is built of a single entity 726, i.e., "Building:cork." Each of the strings 706-710 is ordered according to the entity hierarchy 702 and the entity type hierarchy 704.

Figure 8:
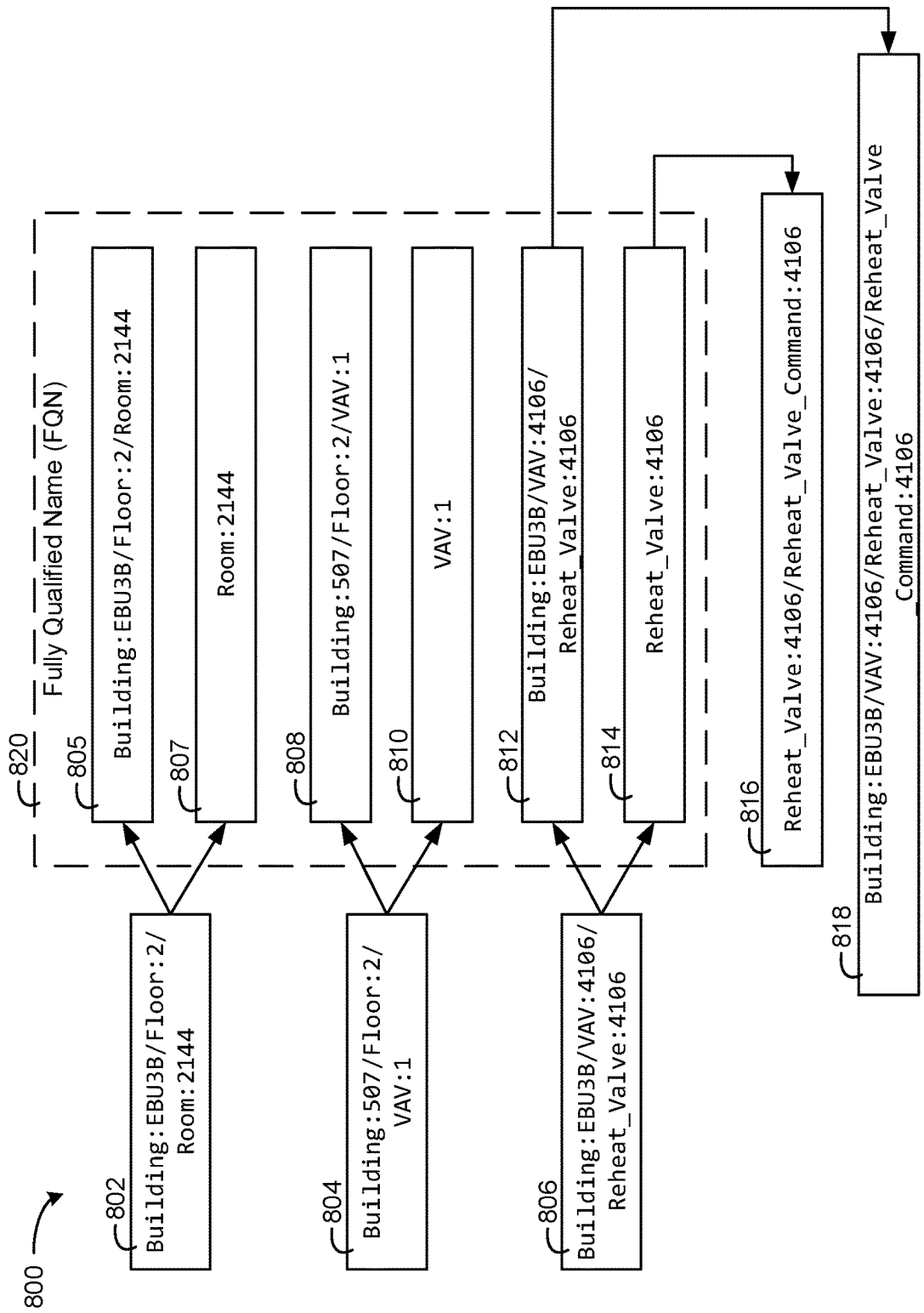
FIG. 8 is a block diagram illustrating a fully qualified name (FQN) for various strings in the universal naming schema, according to an exemplary embodiment.

Referring now to FIG. 8, a block diagram 800 illustrating a fully qualified name (FQN) 820 for various strings in the universal naming schema is shown, according to an exemplary embodiment. The first part in a string of the universal naming schema can be an FQN that uniquely identifies an entity. Once an entity is defined, it can be referenced through an FQN of the entity by other entities or names. The FQN of an entity may be unique in the context of a particular set of strings in the universal naming schema. To reduce the length of an FQN, entity E0 in the first part can be used as an alias if the entity E0 is unique in the context of the particular set of strings.

In FIG. 8, the first part of an entity 802 is "Building: EBU3B/Floor:2/Room:2144." The entity 802 can be referenced through an FQN, i.e., either the FQN 805, "Building: EBU3B/Floor:2/Room:2144," or through E0 of the entity 802 when E0 is unique, "Room:2144," FQN 807. Other examples of the FQN are FQNs 808 and 810, i.e., "Building: 507/Floor:2/VAV:1" and "VAV:1" for the string 804 (where VAV:1 is unique).

The FQN can be used in both the first part and the second part. In the case of the first part, the alias to a FQN could be used to reduce the length of the first part. For example, given a piece of equipment defined by the string 806, i.e., "Building:EBU3BNAV:4106/Reheat_Valve:4106," the FQN 814 could be "Reheat_Valve:4106." The points of the "reheat_Valve:4106" could be defined using the FQN 814. For example, the string 816, i.e., "Reheat_Valve:4106/Reheat_Valve_Command:4106" uses the FQN 814. This is also equivalent to the string 818, i.e., "Building:EBU3BNAV:4106/Reheat_Valve:4106/Reheat_Valve_Command:4106" which can is built from the FQN 812. As can be seen, using the FQN 814 significantly reduces the length of the string 816 as compared to the string 818 that uses the FQN 812.

Figure 9:
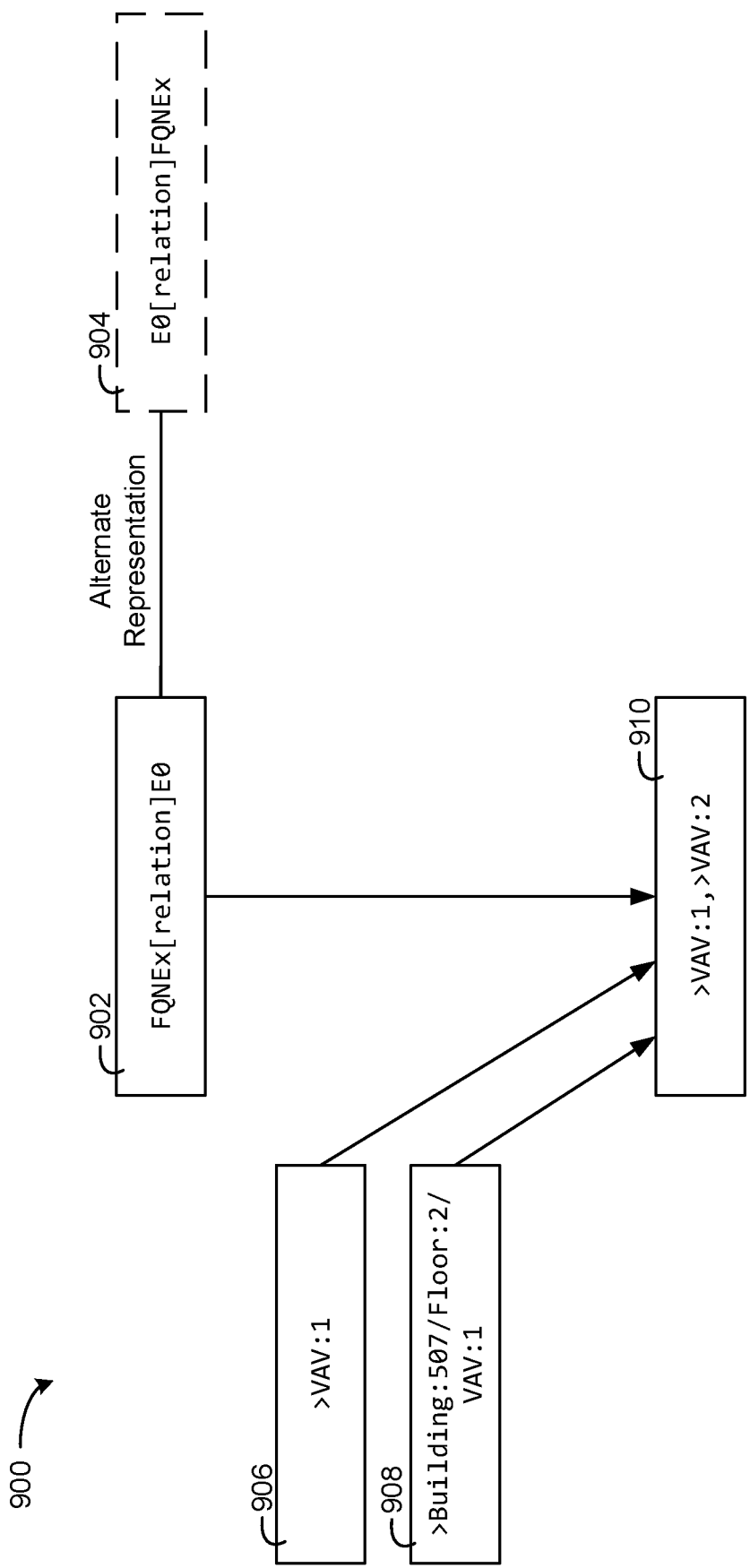
FIG. 9 is a block diagram illustrating a fully qualified name (FQN) and an alternate representation of the FQN of the universal naming schema, according to an exemplary embodiment.

Referring now to FIG. 9, a block diagram 900 illustrating a fully qualified (FQN) and an alternate representation of the FQN of the universal naming schema is shown, according to an exemplary embodiment. The block diagram 900 illustrates the FQN for referencing entities of the second part. The second part encodes additional relationships for the entity defined in the first part. For a string, if no relationships and/or entities need to be captured apart from the relationships and entities captured in the first part, the second part is not needed. However, if additional relationships and/or entities need to be captured in addition to the relationships and/or entities captured in the first part, an FQN referencing to a second part can be used.

The second part can be is divided into one or more sub-parts separated by commas. The FQN can be used to define a sub-part. The FQN can be in in format 902, i.e., "FQNEx[relation]E0." In some embodiments, the FQN can be in the format 904, i.e., "E0[relation]FQNEx." The FQN formats 902 and 904 can be fully qualified names of an entity Ex. The element, "[relation]" of the FQN formats 902 and 904 defines the relationship that an entity E0 has with the entity Ex. In some cases, the entity E0 can be skipped. The strings 906 and 908 can both be used as an FQN to reference another entity, i.e., an entity "VAV:2." A string 910 references the "VAV:2" with an FQN, i.e., ">VAV:1."

Referring now to FIG. 10, a table 1000 illustrating characters of the universal naming schema is shown, according to an exemplary embodiment. In some embodiments, some characters may be reserved in the universal naming schema. The reserved characters may be reserved to indicate a particular meaning. In some embodiments, if the characters of the table 1000 are not available to be reserved, techniques such as escaping sequences or mapping tables can be used to encode the various meanings.

In the table 1000, the character "," is indicated as encoding a separation of parts, i.e., the first part and/or one or more second parts. The character ":" is indicated as encoding entities in the universal naming schema, i.e., encode the entity type and entity name. For example, for an entity type "VAV" and an entity name "1," the character ":" can be used to encode the entity "VAV:1." Furthermore, the table 1000 indicates that brackets, "[ ]" can be used to encode a relationship, e.g., "[hasPart]," "[isA]," "[controls]" etc.

Referring now to FIG. 11, a table 1100 illustrating characters representing relationships in the universal naming schema is shown, according to an exemplary embodiment. In some embodiments, some characters may be reserved in the universal naming schema. The reserved characters may be reserved to indicate a particular meaning. In some embodiments, if the characters of the table 1100 are not available to be reserved, techniques such as escaping sequences or mapping tables can be used to encode the various meanings.

The table 1100 illustrates characters reserved for two different types of relationships. However, in some embodiments, any number of relationships can be represented by a single character or multiple characters. In the table 1100, the character, "/" can encode the relationship "[hasPart]." Furthermore, in the table 1100, the character, ">" can encode the relationship "[feeds]."

In some embodiments, if a relationship is not defined in the universal naming schema (or is not defined in BRICK schema), a user can provide input via the client devices 404 that indicate custom relationships. The custom relationships can be defined in the format, "CUSTOME_RELATION_XYZ" where "XYZ" defines a name that the user provides for the custom relationship. For example, for a relationship, "Forward," that a user provides to the universal naming schema manager 436, the universal naming schema manager 436 could define a relationship, "CUSTOME_RELATION_Forward." In addition to defining custom relationships in the universal naming schema, the universal naming schema manager 436 can be configured to allow a user to input type definitions. For example, for an entity type, "Switch," that a user can provide to the universal naming schema manager 436, the universal naming schema can store an entity type, "CUSTOME_TYPE_Switch."

Referring now to FIG. 12, a table 1200 illustrating exemplary types of location entities of the universal naming schema is shown, according to an exemplary embodiment. The table 1200 indicates a naming standard for location entities of the universal naming schema, i.e., building, floor, room, and/or "HVAC_Zone." In some embodiments, any number of location entity types can be included by the universal naming schema.

The table 1200 further includes use recommendations for the first part and the second part of the universal naming schema for the various entity types. For the building entity type, the recommendations indicate that building names can be used as identifiers in entity E0. The table 1200 further indicates that information such as street address and site reference can be referenced for the building through a second part.

The table 1200 further includes a floor entity type and indicates that integers can be used as identifiers for entity E0 to identify floors as opposed to words, e.g., "Floor:1" as opposed to "Floor:first." The table 1200 indicates that an entity type, "Room," can be identified with numbers for entity E0. Furthermore, the table 1200 indicate that, for an entity type, "HVAC_Zone," entities of the type "HVAC_Zone" can be referenced with room number of section number as identifiers for entity E0.

Referring now to FIG. 13, a table 1300 illustrating an exemplary equipment entity of the universal naming schema is shown, according to an exemplary embodiment. The table 1300 indicates one type of equipment entity, AHU. Any number of entity equipment types can exist in the universal naming schema, e.g., VAV, thermostat, etc. In some embodiments, an FQN alias in the first part is limited to points of equipment. Furthermore, one recommendation for entities of type AHU may be to encode VAVs that an AHU feeds into as the second part elements of the universal naming schema.

Referring now to FIG. 14, a set of strings 1400 including strings 1402-1406 in the universal naming schema representing spaces, points, and equipment is shown, according to an exemplary embodiment. The strings 1402 are strings representing the spaces, the strings 1404 represent the points, while the strings 1406 represent the equipment. The universal naming schema data 442 can be or include the strings 1402-1406. The strings 1402-1406 can be strings that the universal naming schema manager 436 can be configured to generate and/or that the building applications 428 (and/or the building devices 402, the building control system 418, or another device or system) can be configured to operate on.

The strings 1402 are strings that describe spaces of a building. The building is represented as entity "Building: EBU3B" and is further related to a floor, i.e., "Floor:2," a room, i.e., "Room:2144," and an "HVAC_Zone," i.e., "HVAC_Zone:2144." The string "Building:EBU3B/Floor: 2/Room:2144" indicates that the building entity "Building: EBU3B" has a floor, "Floor:2," and that the floor has a room, "Room:2144."

The string "Building:EBU3B/Floor:2/HVAC_Zone: 2144,/Room:2144" indicates that the floor further includes an HVAC zone, "HVAC_Zone:2144." The string sub-section "Building:EBU3B/Floor:2/HVAC_Zone:2144" is a first part while the string subsection "/Room:2144" is a second part. The denotation of the first part and the second part is shown with the character, ",". The second part indicates that the HVAC_Zone:2144 has the room, "Room:2144," already referenced in the string "Building:EBU3B/Floor:2/Room: 2144."

The strings 1404 represent points. With reference to the string "Building:EBU3B/Chilled_Water_System:3B/Pump: 4/VFD:4/Power_Meter:4," the string indicates that a building, "Building:EBU3B" has a chilled water system, "Chilled_Water_System:3B." The chilled water system has a pump, "Pump:4," which in turn has a variable frequency drive (VFD), "VFD:4." Furthermore, the VFD includes a power meter, "Power_Meter:4."

The strings 1406 indicate equipment. For example, the string "Building:EBU3B/AHU:1" indicates that the building references in the strings 1402 and 1406 includes an air handler unit (AHU), "AHU:1." The strings "Building: EBU3B/VAV:4154,/HVAC_Zone:4154,AHU:1>" and "Building:EBU3BNAV:275,/HVAC_Zone:275,AHU:1>" include multiple parts, i.e. the first part and the second part to indicate multiple VAVs that are associated with various HVAC zones in addition to the AHU.

Figure 15:
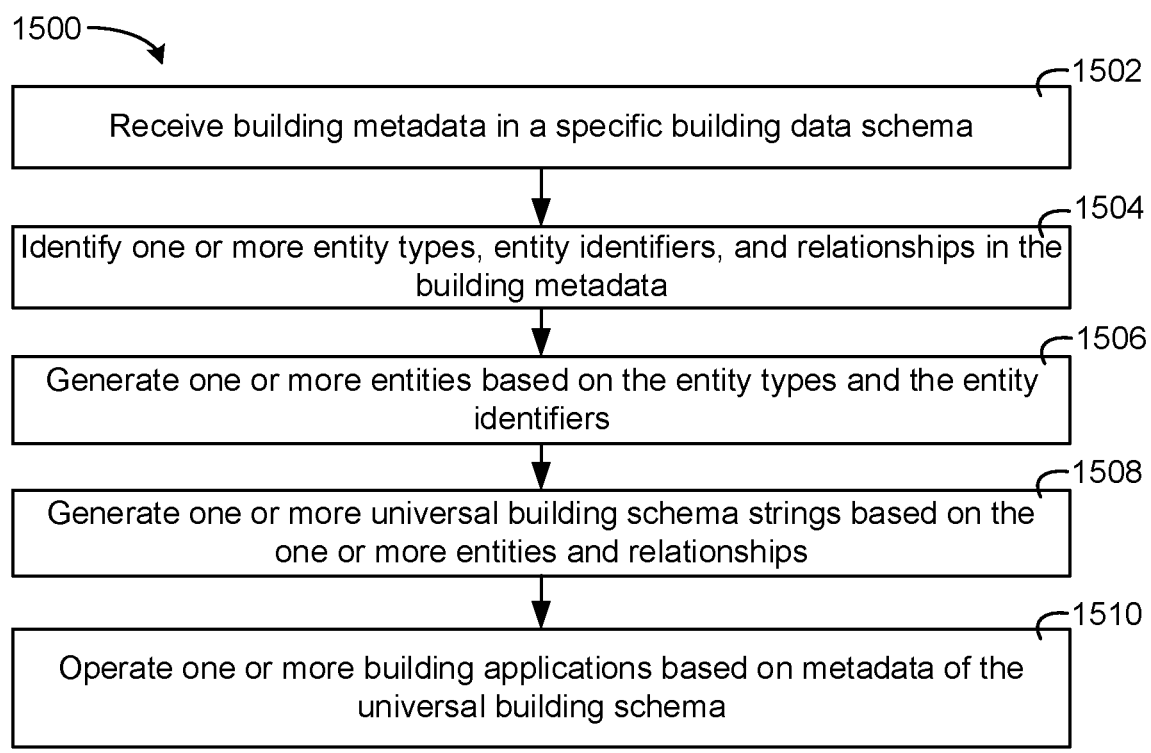
FIG. 15 is a flow chart of a process of receiving building metadata and formatting the building metadata in the universal naming schema, according to an exemplary embodiment.

Referring now to FIG. 15, a flow chart of a process 1500 of formatting building metadata in the universal naming schema is shown, according to an exemplary embodiment. The process 1500 can be performed by the building platform 420. In some embodiments, the process 1500 is performed by the universal naming schema manager 436. Furthermore, any computing device or system as described herein can be configured to perform the process 1500. The process 1500 is described as being performed by the universal naming schema manager 436.

In step 1502, the universal naming schema manager 436 receives building metadata in a specific building data schema. The universal naming schema manager 436 can receive data in a BRICK format, a BACnet format, BIM data, and/or manually entered data input by a user in the universal naming schema. The data can be received from the client devices 404, the building devices 402, the client devices 406 (e.g., the BIM modeling tool 408 and/or the universal naming schema tool 412), the building systems 414, and/or the building control system 418.

In step 1504, the universal naming schema manager 436 can identity one or more entity types, one or more entity identifiers, and/or one or more relationships in the building metadata received in the step 1502. The universal naming schema manager 436 can, in some embodiments, identity the one or more entity types, entity identifiers, and/or relationships in the building metadata by performing string analysis. For example, string analysis may be performed when the data is BACnet data. The string analysis can be the same as, or similar to, the analysis described in U.S. patent application Ser. No. 16/048,052 filed Jul. 27, 2018, the entirety of which is incorporated by reference herein. In some embodiments, if the data is entered manually or is BRICK data, a mapping or script may be used to identify the various entity types, entity identifiers, and/or entity relationships in the building metadata.

In step 1506, the universal naming schema manager 436 can generate one or more entities based on the entity types and the entity identifiers identified in the step 1504. Generating the entities can include generating a string that is a concatenation of the entity type, the character ":", and the entity identifier. For example, for an entity type, "AHU" and an entity identifier "3", the entity may be "AHU:3."

In step 1508, the universal naming schema manager 436 generates one or more universal naming schema strings based on the one or more entities and/or the one or more relationships. The strings can be the same as or similar to the strings 1400 described in FIG. 14. The universal naming schema manager 436 can compile the strings based on the entities generated in the step 1506, the relationships identified the step 1502. The universal naming schema manager 436 can add relationships between entities, for example, characters such as "/" or ">". For example, for entities "AHU:1" and "pressureSetpoint:1," where the entity "pressureSetpoint:1" represents a particular pressure setpoint of the entity "AHU:1," the universal naming schema manager 436 can generate the string "AHU:1/pressureSetpoint:1."

The universal naming schema manager 436 can apply the universal naming schema definitions 444 in generating the one or more strings. For example, the string parts described in FIG. 5, the string construction described in FIG. 6, the entity hierarchy described in FIG. 7, the FQN described in FIG. 8 and FIG. 9, the various reserved characters of FIG. 10 and FIG. 11, and/or the recommendations of the FIG. 12 and FIG. 13 can be used by the universal naming schema manager 436 to generate the strings.

In step 1510, the building applications 428 can operate based on the universal building schema strings. The operations can include equipment control and/or interface visualization. For example, the building applications 428 can utilize the universal building schema strings to control an environmental condition of a space. For example, one string may indicate a value of a temperature setpoint while other strings may relate the space and equipment to the temperature setpoint. The building applications 428 can determine the appropriate control operations for the building applications 428 to perform. In some embodiments, the building applications 428 can generate building visualizations based on the strings, for example, graph data structure visualizations. Furthermore, in some embodiments, the building devices 402 and/or the building control system 418 can operate based on the universal building schema strings.

Referring generally to FIGS. 16-23, systems and methods for translating BIM data edited via a BIM editor into strings of the universal naming schema are shown, according to various exemplary embodiments. In some embodiments, various pieces of software can augment BIM editing software (e.g., Revit) to provide an interface for receiving and/or generate strings in the universal naming schema. In some embodiments, the information input by a user via the augmentation can enable facilitate strings in the universal naming schema or a brick graph directly from a BIM file (e.g., a Revit file (IFC)).

The universal naming schema and/or the BRICK schema can define more entity types and/or relationship types than those defined in BIM (e.g., within Revit or an IFC file). Accordingly, the BIM modeling tool 408 may include an augmentation that allows an entity of a BIM file to be ingested by the universal naming schema manager 436 into universal naming schema data 442. In some embodiments, entities of the BIM file can include a name that a user can encode with an entity type, entity identifier, and/or one or more relationships between entities.

The universal naming schema manager 436 can extract the names from the BIM file and construct strings in the universal naming schema. In some embodiments, the strings constructed by the universal naming schema manager 436 from the BIM files can be used by the building applications 428 to perform equipment control or data visualization. In some embodiments, the strings can be used to manage data storage. For example, the strings can be used to derive relationships between data collected from the building equipment (e.g., timeseries data) and nodes of a BRICK graph (e.g., the graph of FIG. 3).

In some embodiments, existing entities and/or relationships of a BIM can be utilized by the universal naming schema manager 436 for translating from BIM to the strings of the universal naming schema. Furthermore, in some embodiments, users can enter entity names, entity types, and/or relationships for identification by the universal naming schema manager 436 via a user interface of a piece of BIM modeling software such as REVIT. Furthermore, the tree structure of a BIM file can be used by the universal naming schema manager 436 to generate the strings in the universal naming schema.

In some embodiments, a user can add entity types and/or relationships directly into the BIM modeling tool 408. The BIM schema data 410 that the BIM modeling tool 408 exports can be analyzed by the universal naming schema manager 436. The universal naming schema manager 436 can extract a brick graph and/or export strings following the universal naming schema. An example of a string generated by the universal naming schema manager 436 from the BIM schema data 410 may be: "Building:1AlbertQuay/Floor:F4/ Meeting Room:north/VAV:401/VAV Damper Position Sensor:1".

Referring now to FIG. 16, a user interface 1600 of the BIM modeling tool 408 is shown where a building name is entered into the user interface in the universal naming schema, according to an exemplary embodiment. For a BIM file, the interface 1600 allows for editing of parameter values of parameters of the BIM file. The BIM file includes a building name parameter. A user can enter, via the user interface 1600, the building name in the entity format of the universal naming schema, e.g., "Building:ID." The parameter value for the building name parameter of the interface 1600 is "Building:1AlbertQuay." However, another example of the parameter value could be "Building:beeah_test." The universal naming schema manager 436 can be configured to search the BIM file to identify the parameter value entered by the user in the universal naming schema.

Figure 17:
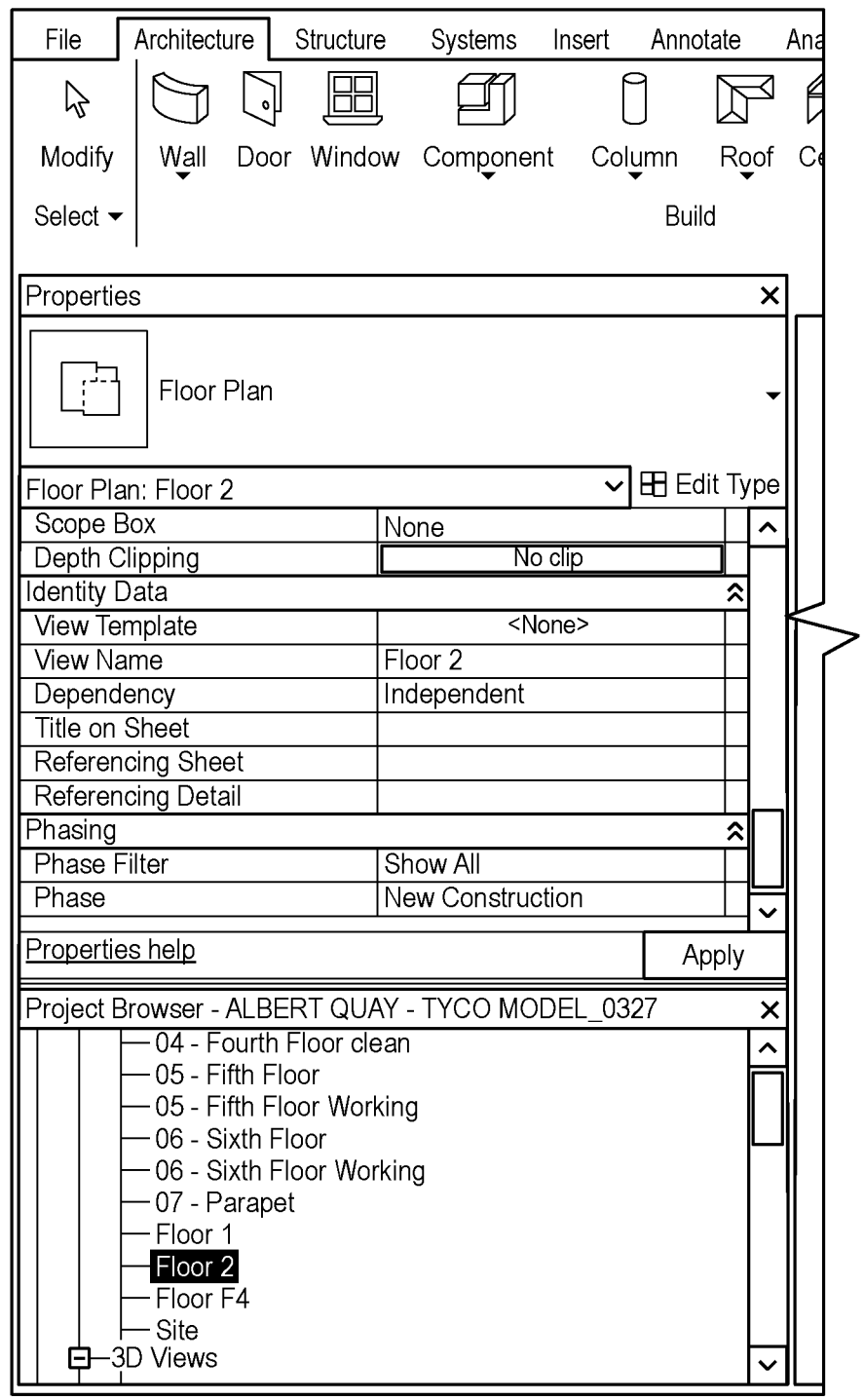
FIG. 17 is a user interface of a building information modeling (BIM) tool where a floor name is entered into the user interface in the universal naming schema, according to an exemplary embodiment.

Referring now to FIG. 17, a user interface 1700 of the BIM modeling tool 408 is shown where a floor name is entered into the user interface in the universal naming schema, according to an exemplary embodiment. The interface 1700 illustrates parameters and parameter values of a particular floor of a building, floor 2, in addition to a tree illustrating the various other floors of the building. The parameter value of the view name parameter of the floor plan in the interface 1700 is "Floor 2."

The parameter value can be used as the entity identifier and/or entity type. The universal naming schema manager 436 can identify a type of the entity represented by the BIM element with the first word of the string, "Floor," and identity the entity identifier with the following characters of the string, "2". The universal naming schema manager 436 can concatenate the characters with a ":" to form the entity, "Floor:2." Other examples of strings that a user might enter into the user interface 1700 are "Floor 1," "Floor 2," "Floor Basement," "Floor F4," etc.

Figure 18:
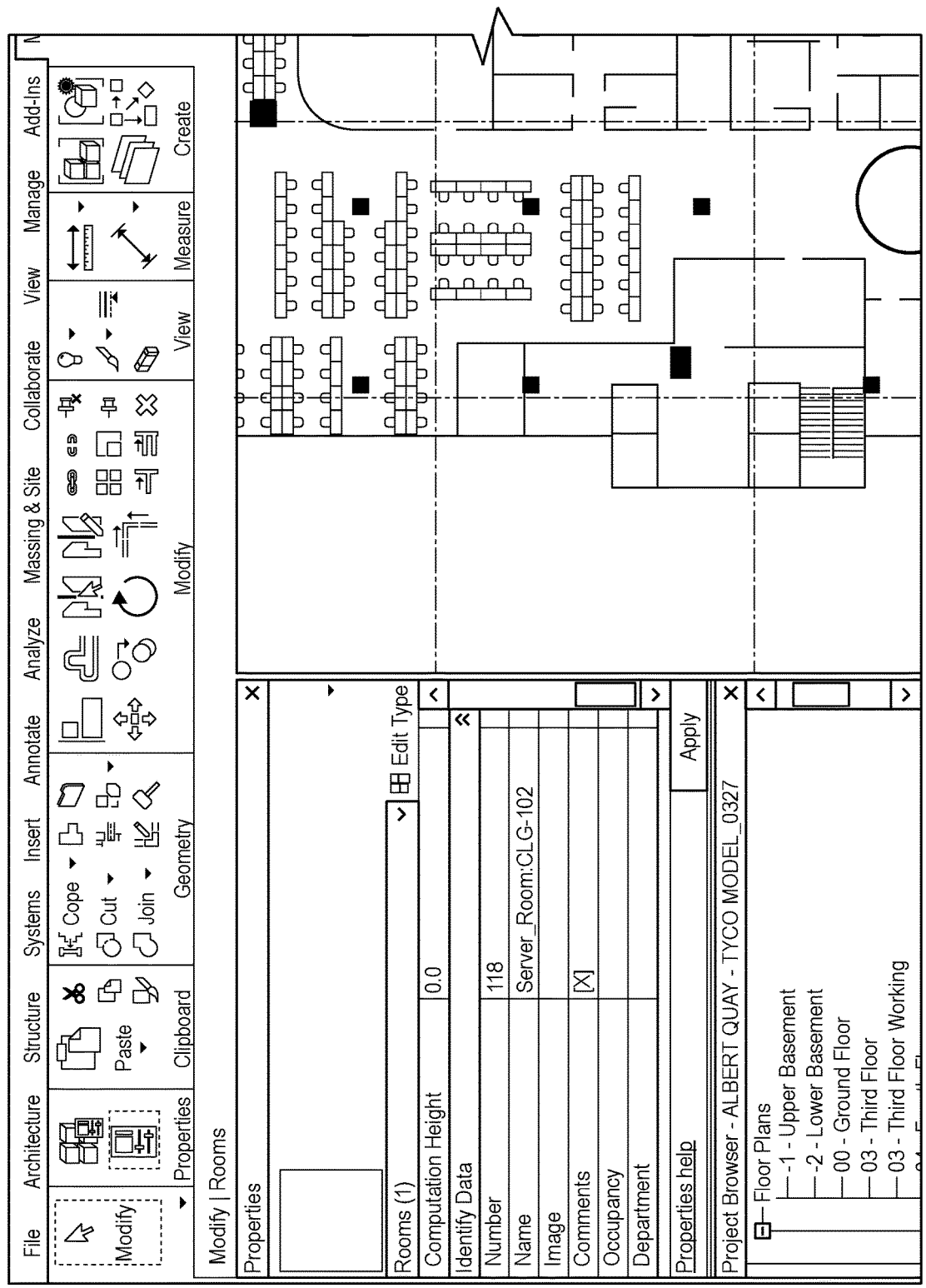
FIG. 18 is a user interface of a building information modeling (BIM) tool where a room name is entered into the user interface in the universal naming schema, according to an exemplary embodiment.

Referring now to FIG. 18, a user interface 1800 of the BIM modeling tool 408 is shown where a room name is entered into the user interface in the universal naming schema, according to an exemplary embodiment. A user may enter the name of a room as the value of the name parameter. For example, the user may enter "Room Type:ID" where ID is the particular identifier that the user selects for the room.

As an example, in the user interface 1800, the parameter value of the name parameter is "Server Room:CLG-102." Other examples of rooms could be "Conference Room:103." The universal naming schema manager 436 can be configured to extract the strings from the BIM file for generating strings in the universal naming schema. The universal naming schema manager 436 can be configured to search the BIM for values of the name parameter for rooms (e.g., user entered values) and generate the strings in the universal naming schema based on the values of the name parameter.

Additional relationships for the room entity can be introduced as the second parts elements. These elements can be entered as "[X]part2" These additional relationships can be entered by a user into the user interface 1800 via the parameter values for the comments parameter. If there is no second part element, a user may enter "[X]" as is shown in the user interface 1800.

Figure 19:
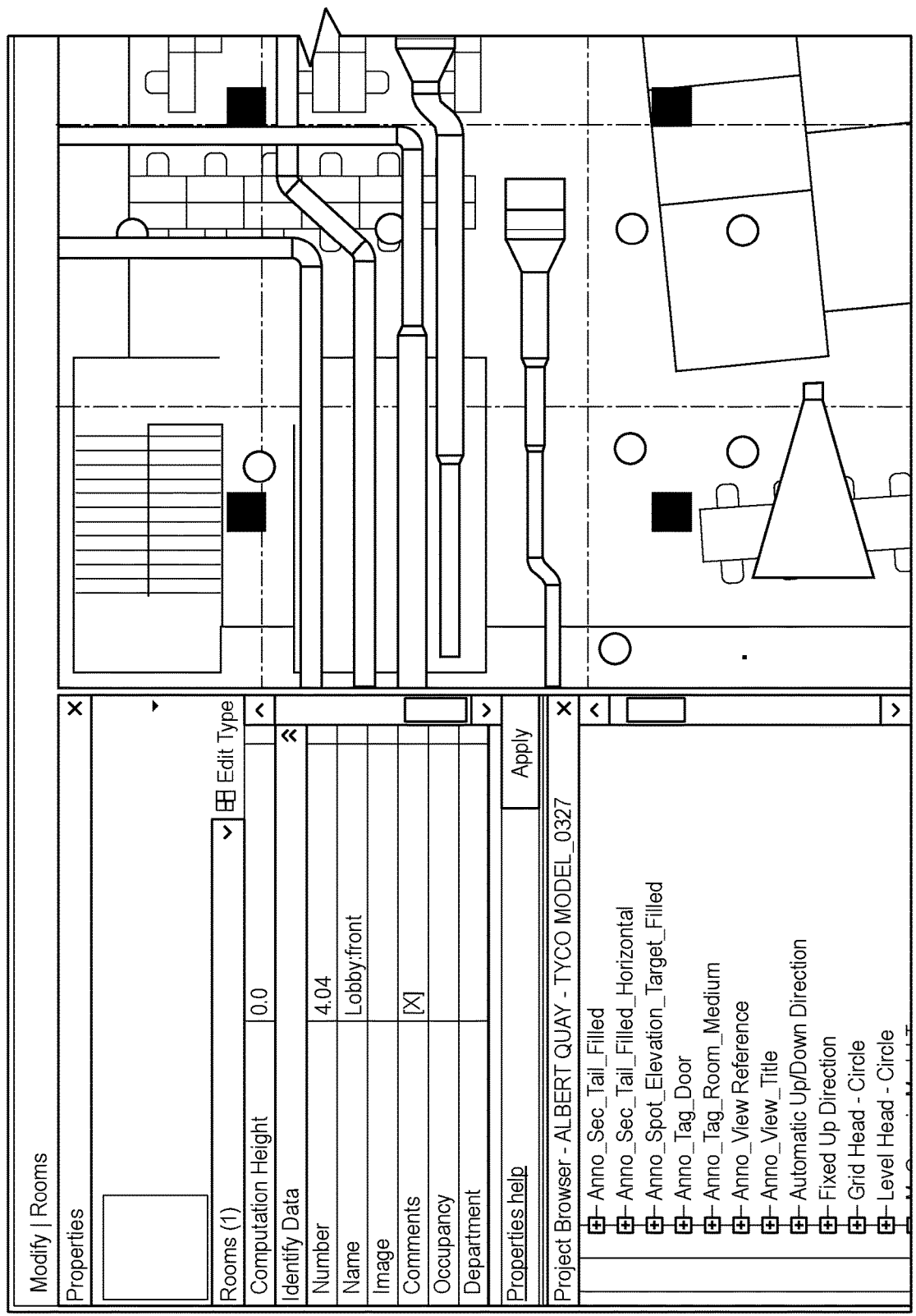
FIG. 19 is another user interface of a building information modeling (BIM) tool where a room name is entered into the user interface in the universal naming schema, according to an exemplary embodiment.
Figure 20:
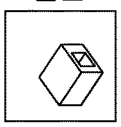
FIG. 20 includes user interfaces of a building information modeling (BIM) tool where an equipment name is entered into the user interface in the universal naming schema, according to an exemplary embodiment.

Referring now to FIG. 19, a user interface 1900 of the BIM modeling tool 408 is shown where a room name is entered into the user interface in the universal naming schema, according to an exemplary embodiment. The interface 1900 is similar to the interface 1800 where a user enters the name of a room as a "Room Type:ID" as the parameter value for a name parameter. However, because the room of the interface 1900 is a front lobby and not a normal room, the room type is "Lobby." In the user interface 1900, the user enters the parameter value as "Lobby:front." The universal naming schema manager 436 can be configured to extract the strings from the BIM file for generating strings in the universal naming schema by searching the BIM for parameter values of the name parameter for rooms, e.g., the front lobby shown in the interface 1900. The universal naming schema manager 436 can be configured to utilize the user entered values to generate the strings in the universal naming schema Referring now to FIG. 20, user interfaces 2000 and 2002 of the BIM modeling tool 408 are shown where information for an equipment entity is entered into the user interface in the universal naming schema, according to an exemplary embodiment. The interfaces 2000 and 2002 allow a user to enter parameter values of parameters describing the equipment, in the interfaces 2000 and 2002, a variable air volume (VAV) box. The parameters are a comments parameter and a name parameter shown in the interface 2000 and a type parameter shown in the interface 2002.

A user can enter an entity into the name parameter uniquely identifying the piece of equipment and the type of the entity via the interface 2000 in the format "Equipment Type:ID." The user can enter a type of the equipment into the type parameter via the interface 2002. Furthermore, related entities and relationships can be entered as the second part and can be entered as a parameter value of the comments parameter via the interface 2000.

Figure 21:
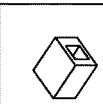
FIG. 21 is user interfaces of a building information modeling (BIM) tool where an equipment name, equipment relationships, and an equipment type are entered into the user interface in the universal naming schema, according to an exemplary embodiment.

Referring now to FIG. 21, a user interface 2100 of the BIM modeling tool 408 is shown where an equipment name, equipment relationships, and an equipment type are entered into the user interface 2100 in the universal naming schema, according to an exemplary embodiment. The interface 2100 indicates parameters and parameter values of another VAV box. The equipment can be defined as an entity "Equipment Type:ID" by the user entering a value for the name parameter, e.g., "VAV:401." Furthermore, the equipment type can be entered via the type parameter, e.g., "VAV." The comments parameter can be used for entering a second part, e.g., "[x]AHU:1>." The second part indicates that an AHU, "AHU:1" feeds the VAV whose parameters are shown in the interfaces 2100 and 2102.

Referring now to FIG. 22, a output 2200 illustrating the result of a script that processes an Industry Foundation Classes (IFC) file into strings of the universal naming schema is shown, according to an exemplary embodiment. The output 2200 illustrates an example output that can be displayed on a user interface of the client devices 404 where a user provides a destination of an IFC file to the universal naming schema manager 436 and the universal naming schema manager 436 translates the IFC file into the universal naming schema data 442. The universal naming schema manager 436 can generate the output 2200 and cause the user interface of the client devices 404 to display the output 2200.

Figure 23:
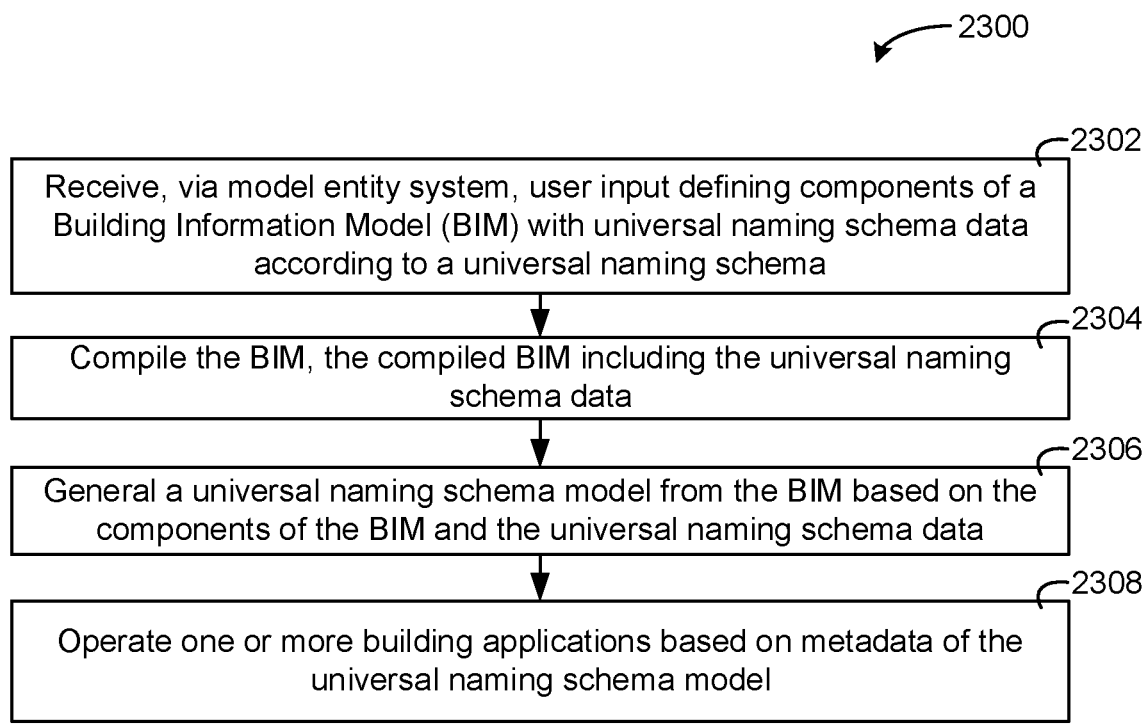
FIG. 23 is a flow diagram of a process of translating a building information modeling (BIM) file into strings of the universal naming schema, according to an exemplary embodiment.

Referring now to FIG. 23, a flow diagram of a process 2300 is shown of translating a building information modeling (BIM) file into strings of the universal naming schema, according to an exemplary embodiment. The process 2300 can be performed by the building platform 420. In some embodiments, the process 2300 is performed by the universal naming schema manager 436. In some embodiments, the process 2300 is performed by the universal naming schema tool 412. Furthermore, any computing device or system as described herein can be configured to perform the process 2300. The process 2300 is described as being performed by the universal naming schema manager 436.

In step 2302, the universal naming schema tool 412 receives user input defining components of a BIM with universal naming schema data. The user may define components of a building, equipment, spaces, people, etc. via interfaces, e.g., the interfaces shown in FIGS. 16-21. The user may also input information data associated with the universal naming schema. For example, for one or multiple of the components, the user may indicate relationship information, entity type information, entity identity information, part information, etc.

In step 2304, the information received in the step 2302 can be compiled. For example, BIM modeling tool 408 can compile the data to generate a BIM file and/or an IFC file. The result of compiling the information received in the step 2303 can be the BIM schema data 410.

In step 2306, the universal naming schema manager 436 can generate the universal naming schema data based on the components of the compiled BIM and the universal naming schema data of the BIM. The universal naming schema manager 436 can extract universal naming schema data from the BIM and generate the universal naming schema model by generating strings based on the extracted universal naming schema data and the components of the BIM. Based on the generated universal naming schema model, in step 2308, the building applications 428 can operate to control equipment of a building and/or generate graphic visualizations for display on a user interface of the client devices 404.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed:

1. A building system of a building, the building system comprising one or more memory devices storing instructions thereon, that, when executed by one or more processors, cause the one or more processors to:
    receive building metadata strings in a first schema, the building metadata strings describing a plurality of components of the building, a first string of the building metadata strings representing a first component, a second component, and a first relationship between the first component and the second component, a second string of the building metadata strings representing the first component, a third component, and a second relationship between the first component and the third component;
    generate, based on the building metadata strings, a plurality of characters in a universal schema, the plurality of characters representing the plurality of components of the building described in the building metadata strings, the plurality of characters representing the first component, the second component, and the third component;
    generate, based on the building metadata strings, relationship characters in the universal schema between the plurality of components of the building, a first relationship character relating the first component to the second component and a second relationship character relating the first component to the third component; and
    generate a single metadata string in the universal schema, the single metadata string to de-duplicate the first string of the building metadata strings and the second string of the building metadata strings, the single metadata string comprising the plurality of characters representing the first component, the second component, the third component and the relationship characters indicating that that first component is related to both the second component and the third component.

2. The building system of claim 1, wherein the relationship characters represent one or more relationships with at least one of a single reserved character, the single reserved character linked to a particular relationship of a plurality of predefined relationships or a character set, the character set representing the particular relationship of the plurality of predefined relationships.

3. The building system of claim 1, wherein the first component, the second component, and the third component are each represented by:
    one or more type characters representing component type; and
    one or more identifier characters identifying a particular instance of the component type.

4. The building system of claim 3, wherein the component type is a particular component type of a set of a plurality of predefined component types.

5. The building system of claim 1, wherein the single metadata string is referenced by a fully qualified name (FQN), wherein the FQN is an ending component of the single metadata string.

6. The building system of claim 5, wherein the instructions further cause the one or more processors to generate a second metadata string comprising:
    a first part represented by a plurality of first characters, wherein the first part is the FQN;
    a separation character separating the first part from a second part; and
    the second part representing at least one fourth component of the plurality of components related to the single metadata string.

7. The building system of claim 1, wherein the building metadata strings include data of a building information model (BIM);
    wherein the BIM is defined by a user and represents the building and the plurality of components of the building, wherein the BIM is augmented by the user to include naming data for each of the plurality of components according to the universal schema.

8. The building system of claim 7, wherein the BIM is augmented by the user to include a definition of a second part relating the first component of the plurality of components to one or more components of the plurality of components;
    wherein the instructions cause the one or more processors to generate a particular metadata string including a first part representing the first component and the second part representing the one or more components of the plurality of components.

9. The building system of claim 7, wherein the instructions cause the one or more processors to generate, based on the building metadata strings, the plurality of characters by identifying, based on the BIM, the naming data for each of the plurality of components, the naming data representing the plurality of components with a component type and a component identifier.

10. The building system of claim 7, wherein the instructions cause the one or more processors to determine, based on the building metadata strings, relationships between the plurality of components by identifying relational information between the plurality of components indicated by the BIM.

11. The building system of claim 1, wherein the instructions further cause the one or more processors to generate a plurality of metadata strings comprising:
    a first part represented by a plurality of first characters, wherein the first part represents one or more fourth components of the plurality of components;
    one or more separation characters separating the first part from one or more second parts and the one or more second parts from each other; and
    each of the one or more second parts representing one or more fifth components of the plurality of components.

12. The building system of claim 11, wherein the one or more fourth components ordered within the first part with one or more other components of the plurality of components according to a predefined component type hierarchy of the universal schema.

13. The building system of claim 12, wherein the predefined component type hierarchy lists components according to component type from a building component type to a floor component type to a room component type to an equipment component type to a point component type.

14. A method comprising:
receiving, by a processing circuit, building metadata strings in a first schema, the building metadata strings describing a plurality of components of a building, a first string of the building metadata strings representing a first component, a second component, and a first relationship between the first component and the second component, a second string of the building metadata strings representing the first component, a third component, and a second relationship between the first component and the third component;
generating, by the processing circuit, based on the building metadata strings, a plurality of characters in a universal schema, the plurality of characters representing the plurality of components of the building described in the building metadata strings, the plurality of characters representing the first component, the second component, and the third component;
generating, by the processing circuit, based on the building metadata strings, relationship characters in the universal schema between the plurality of components of the building, a first relationship character relating the first component to the second component and a second relationship character relating the first component to the third component; and
generating, by the processing circuit, a single metadata string in the universal schema, the single metadata string to de-duplicate the first string of the building metadata strings and the second string of the building metadata strings, the single metadata string comprising the plurality of characters representing the first component, the second component, the third component and the relationship characters indicating that that first component is related to both the second component and the third component.

15. The method of claim 14, wherein the relationship characters represent one or more relationships with at least one of a single reserved character, the single reserved character linked to a particular relationship of a plurality of predefined relationships or a character set, the character set representing the particular relationship of the plurality of predefined relationships.

16. The method of claim 14, wherein the first component, the second component, and the third component are each represented by:
one or more type characters representing component type; and
one or more identifier characters identifying a particular instance of the component type.

17. The method of claim 16, wherein the component type is a particular component type of a set of a plurality of predefined component types.

18. The method of claim 14, wherein the single metadata string is referenced by a fully qualified name (FQN), wherein the FQN is an ending component of the single metadata string.

19. The method of claim 18, the method further comprising:
generating, by the processing circuit, a second metadata string including:
a first part represented by a plurality of first characters, wherein the first part is the FQN;
a separation character separating the first part from a second part; and
the second part representing at least one fourth component of the plurality of components related to the single metadata string.

20. One or more non-transitory computer readable storage media configured to store instructions thereon, that, when executed by one or more processors, cause the one or more processors to:
receive building metadata strings in a first schema, the building metadata strings describing a plurality of components of a building, a first string of the building metadata strings representing a first component, a second component, and a first relationship between the first component and the second component, a second string of the building metadata strings representing the first component, a third component, and a second relationship between the first component and the third component;
generate, based on the building metadata strings, a plurality of characters in a universal schema, the plurality of characters representing the plurality of components of the building described in the building metadata strings, the plurality of characters representing the first component, the second component, and the third component;
generate, based on the building metadata strings, relationship characters in the universal schema between the plurality of components of the building, a first relationship character relating the first component to the second component and a second relationship character relating the first component to the third component;
generate a single metadata string in the universal schema, the single metadata string to de-duplicate the first string of the building metadata strings and the second string of the building metadata strings, the single metadata string comprising the plurality of characters representing the first component, the second component, the third component and the relationship characters indicating that that first component is related to both the second component and the third component; and
operate, based on the single metadata string, a piece of building equipment to control an environmental condition of the building.

21. The building system of claim 1, wherein the instructions cause the one or more processors to:
identify, based on the single metadata string, a portion of the single metadata string comprising characters representing a control variable and a value for the control variable;
identify, using the control variable, a control operation and a piece of building equipment to execute the control operation; and
operate the piece of building equipment to execute the control operation to control a condition of the building.

22. The building system of claim 1, wherein the instructions cause the one or more processors to:
load a building information model (BIM) file responsive to receiving an indication of the BIM file, the BIM file comprising data to visually represent the plurality of components of the building;

analyze the data of the BIM file to identify representations of the plurality of components of the building and the relationships between the plurality of components of the building; and generate the plurality of characters responsive to identifying the representations of the plurality of components in the BIM file; and generate the relationship characters responsive to identifying the representations of the relationships in the BIM file.

23. The building system of claim 1, wherein the instructions cause the one or more processors to:

receive a user input from a user device, the user input defining parameter values for parameters defining the plurality of components;

cause a building information model (BIM) file to store the parameter values responsive to a reception of the user input;

analyze the parameter values stored in the BIM file to identify representations of the plurality of components and the relationships between the plurality of components;

generate the plurality of characters responsive to identifying the representations of the plurality of components in the BIM; and generate the relationship characters responsive to identifying the representations of the relationships in the BIM.

* * * * *